United States Patent
Peng et al.

(10) Patent No.: US 10,856,286 B2
(45) Date of Patent: Dec. 1, 2020

(54) DATA TRANSMISSION METHOD AND APPARATUS

(71) Applicant: HUAWEI TECHNOLOGIES CO., LTD., Guangdong (CN)

(72) Inventors: Jinlin Peng, Shanghai (CN); Pengpeng Dong, Shanghai (CN); Zongjie Wang, Shenzhen (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/402,818

(22) Filed: May 3, 2019

(65) Prior Publication Data

US 2019/0261335 A1    Aug. 22, 2019

Related U.S. Application Data

(63) Continuation of application No. PCT/CN2017/109362, filed on Nov. 3, 2017.

(30) Foreign Application Priority Data

Nov. 4, 2016   (CN) .......................... 2016 1 0982030
Dec. 30, 2016  (CN) .......................... 2016 1 1271245
Mar. 20, 2017  (CN) .......................... 2017 1 0167223

(51) Int. Cl.
*H04W 72/04*    (2009.01)
*H04L 5/00*     (2006.01)
(Continued)

(52) U.S. Cl.
CPC ......... *H04W 72/042* (2013.01); *H04L 1/1867* (2013.01); *H04L 5/00* (2013.01);
(Continued)

(58) Field of Classification Search
CPC ............ H04W 72/042; H04W 72/0446; H04L 1/1867; H04L 5/00; H04L 5/0053; H04L 5/0055; H04L 1/0013; H04L 1/1822
See application file for complete search history.

(56) References Cited

U.S. PATENT DOCUMENTS 7,853,853 B2    12/2010  Demirhan et al.
9,831,958 B2 *  11/2017  Hwang ................. H04L 1/0041
(Continued)

FOREIGN PATENT DOCUMENTS

CN    101615986 A    12/2009
CN    102315897 A    1/2012
(Continued)

OTHER PUBLICATIONS

Office Action issued in Chinese Application No. 201710167223.0 dated Feb. 28, 2020, 7 pages.
(Continued)

*Primary Examiner* — Peter P Chau
*Assistant Examiner* — Louis Samara
(74) *Attorney, Agent, or Firm* — Fish & Richardson P.C.

(57) ABSTRACT

In a data transmission method, a terminal device receives control information, and receives data of a transport block (TB); and the terminal devices obtains m code block (CB) groups in the TB, where m is a positive integer, m=min $(N_{CB\_re}, N_{Group\_max})$, $N_{CB\_re}$ is a quantity of CBs in the TB, $N_{Group\_max}$ is a maximum value of a quantity of CB groups, each of the m CB groups includes at least one CB, $N_{CB\_re}$ is determined based on a TB size (TBS) and a maximum value of a data size of a CB, and the TBS is determined based on the control information.

24 Claims, 16 Drawing Sheets

(51) Int. Cl.
*H04L 1/18* (2006.01)
*H04L 1/00* (2006.01)

(52) U.S. Cl.
CPC .......... *H04L 5/0053* (2013.01); *H04L 5/0055* (2013.01); *H04W 72/0446* (2013.01); *H04W 72/0453* (2013.01); *H04L 1/0013* (2013.01)

(56) References Cited

U.S. PATENT DOCUMENTS

| | | | | |
|---|---|---|---|---|
| 9,973,305 | B2* | 5/2018 | Hwang | ............. H04W 72/1252 |
| 2016/0226643 | A1* | 8/2016 | Mallik | .................. H04L 1/1819 |
| 2017/0294990 | A1 | 10/2017 | Xu et al. | |

FOREIGN PATENT DOCUMENTS

| | | |
|---|---|---|
| CN | 102355341 A | 2/2012 |
| CN | 104283630 A | 1/2015 |
| CN | 104301077 A | 1/2015 |
| CN | 105515719 A | 4/2016 |
| EP | 3474475 A1 | 4/2019 |
| EP | 3584977 A1 | 12/2019 |
| JP | 2016048949 A | 4/2016 |
| JP | 2016154273 A | 8/2016 |
| JP | 2020511820 A | 4/2020 |
| WO | WO-2016045391 A1 * | 3/2016 ............... H04L 1/00 |
| WO | 2016072220 A1 | 5/2016 |
| WO | 2016126330 A1 | 8/2016 |
| WO | 2018152714 A1 | 8/2018 |

OTHER PUBLICATIONS

Extended European Search Report issued in European Application No. 17867486.7 dated Oct. 23, 2019, 8 pages.
Qualcomm Incorporated,"UCI content", Abstract, Presented at 3GPP TSG-RAN WG1 #86 R1-1610179, Lisbon, Portugal, Oct. 10-14, 2016, 2 pages.
PCT International Search Report and Written Opinion in International Application No. PCT/CN2017109362, dated Jan. 25, 2018, 17 pages (With English translation).
Lenovo, Motorola Mobility, "Enhanced HARQ feedback for downlink transmission," 3GPP TSG RAN WG1 Meeting #88, R1-1702665, Athens, Greece, Feb. 13-17, 2017, 3 pages.
Samsung, "Discussion on partial retransmission for eMBB," 3GPP TSG RAN WG1 Meeting NR#1, R1-1700959, Spokane, USA, Jan. 16-20, 2017, 4 pages.
Office Action issued in Japanese Application No. 2019-523653 dated Aug. 25, 2020, 11 pages (with English translation).
EPO Communication pursuant to Article 94(3) EPC issued in European Application No. 178671220 dated Oct. 5, 2020, 6 pages.

* cited by examiner

DATA TRANSMISSION METHOD AND APPARATUS

CROSS-REFERENCE TO RELATED APPLICATIONS

This application is a continuation of International Application No. PCT/CN2017/109362, filed on Nov. 3, 2017, which claims priority to Chinese Patent Application No. 201610982030.6, filed on Nov. 4, 2016, Chinese Patent Application No. 201611271245.3, filed on Dec. 30, 2016, and Chinese Patent Application No. 201710167223.0, filed on Mar. 20, 2017. All of aforementioned applications are incorporated herein by reference in their entireties.

TECHNICAL FIELD

This application relates to the field of data processing technologies, and in particular, to a data transmission method and apparatus.

BACKGROUND

In a Long Term Evolution (LTE) technology, a data processing procedure at a transmitting end includes: adding a cyclic redundancy check (CRC) to a transport block (TB); dividing the TB into one or more code blocks (CB), and adding a CRC to each CB; and then performing operations such as encoding, rate matching, and resource mapping on each CB and then sending the CB. A receiving end attempts to decode each CB after receiving the data and performing inverse operations such as inverse resource mapping and rate matching on the data. If CRCs for data obtained after all CBs are decoded succeeds and the CRC of the TB succeeds, a 1-bit acknowledgement (ACK) indication is fed back, to notify the transmitting end that the TB is successfully transmitted. If CRCs of data obtained after a CB is decoded fails or the CRC of the TB fails, a 1-bit negative acknowledgement (NACK) indication is fed back, to notify the transmitting end that the TB is unsuccessfully transmitted. The transmitting end may retransmit data of the TB, to ensure data communication reliability.

In the foregoing method, if the receiving end determines that a CRC of data obtained after a CB is decoded fails, the transmitting end needs to retransmit the data of the entire TB. This causes relatively low transmission efficiency.

SUMMARY

Embodiments of the present disclosure provide a data transmission method and apparatus, to improve transmission efficiency.

The following technical solutions are used in the embodiments of the present disclosure to achieve the foregoing objective.

According to a first aspect, a TB division method is provided, including: dividing a TB into m code block CB groups, where m≥2, m is an integer, and a CB group includes at least one CB. In the technical solution, one TB is divided into a plurality of CB groups, and each CB group includes at least one CB. In this way, if the technical solution is applied to a data transmission process, if a receiving end determines that data of one CB group or data of one or more CBs in one CB group is unsuccessfully transmitted, a transmitting end needs to retransmit the data only of the CB group. Therefore, resources can be saved, and transmission efficiency is improved. For example, if a CRC of data obtained after each CB in one CB group is decoded succeeds, an ACK is fed back, to notify the transmitting end that the CB group is successfully transmitted; or if a CRC of data obtained after a CB in one CB group is decoded fails, a NACK is fed back, to notify the transmitting end that the CB group is unsuccessfully transmitted, and the transmitting end may retransmit the data of the CB group.

In a possible design, the dividing a TB into m CB groups may include: determining an actual value m of a quantity of CB groups based on a maximum value $N_{Group\_max}$ of the quantity of CB groups. Optionally, $m=N_{Group\_max}$. For related descriptions of this implementation, refer to a manner 4 of "determining the actual value m of the quantity of CB groups" in the description of embodiments.

In a possible design, the dividing a TB into m CB groups may include: determining an actual value m of a quantity of CB groups based on a data size TBS of the TB, a maximum value $CB_{max}$ of a data size of a CB, and a maximum value $N_{Group\_max}$ of the quantity of CB groups. For related descriptions of this implementation, refer to a manner 10 of "determining the actual value m of the quantity of CB groups" in the description of embodiments.

Optionally, a reference value $N_{CB\_re}$ of a quantity of CBs obtained by dividing the TB is first determined based on a formula $$N_{CB\_re} = \text{ceil}\left(\frac{TBS}{CB_{max}}\right).$$

The actual value m of the quantity of CB groups is then determined based on a formula $$m = \min\left(\text{ceil}\left(\frac{N_{CB\_re}}{K}\right), N_{Group\_max}\right).$$

TBS denotes the data size of the TB. If no CRC is added to the TB, the data size TBS of the TB is a data size of the TB. If a CRC is added to the TB, the data size TBS of the TB is a sum of a data size of the TB and a size of the CRC added to the TB.

$CB_{max}$ denotes the maximum value of the data size of the CB. If no CRC is added to the CB, the maximum value $CB_{max}$ of the data size of the CB is a maximum CB size (for example, $CB_{max}$ may be 6144 bits in LTE; or $CB_{max}$ may be 8192 bits in NR/5G). If a CRC is added to the CB, the maximum value $CB_{max}$ of the data size of the CB is obtained by subtracting, from a maximum CB size, a size of the CRC added to the CB. ceil( ) denotes rounding up.

K may be 1, or a minimum value $N_{CB\_min}$ of a quantity of CBs included in one CB group, or a quantity $N_{CB\_perGroup}$ (or referred to as a granularity of a CB group) of CBs included in one CB group, or a maximum value $N_{CB\_max}$ of a quantity of CBs included in one CB group. $N_{CB\_min}$, $N_{CB\_perGroup}$, and $N_{CB\_max}$ may all be preset or configured by using signaling, and performing configuration by using signaling may include dynamically/semi-statically performing configuration by using higher layer signaling or physical layer signaling.

In a possible design, the dividing a TB into m CB groups may include: determining an actual value m of a quantity of CB groups based on a data size TBS of the TB, a maximum value $CB_{Group\_max}$ of a data size of a CB group, and a maximum value $N_{Group\_max}$ of the quantity of CB groups. For related descriptions of this implementation, refer to a manner 11 of "determining the actual value m of the quantity of CB groups" in the description of embodiments.

Optionally, a reference value $N_{Group\_re}$ of the quantity of CB groups is determined based on a formula $$N_{Group\_re} = \text{ceil}\left(\frac{TBS}{CB_{Group\_max}}\right),$$

and m is then determined based on a formula m=min $(N_{Group\_re}, N_{Group\_max})$. For related explanations of the TBS, refer to the foregoing. If no CRC is added to the CB group, $CB_{Group\_max}$ is a maximum quantity of bits of data of the CB group. If a CRC is added to the CB group, $CB_{Group\_max}$ is obtained by subtracting, from a maximum quantity of bits of data of the CB group, a size of the CRC added to the CB group. $CB_{Group\_max}$ may be preset or configured by using signaling, and performing configuration by using signaling may include dynamically/semi-statically performing configuration by using higher layer signaling or physical layer signaling.

$N_{Group\_max}$ in any one of the foregoing solutions may be preset or configured by using signaling, and performing configuration by using signaling may include dynamically/semi-statically performing configuration by using higher layer signaling or physical layer signaling.

In a possible design, the dividing a TB into m CB groups may include: determining an actual value m of a quantity of CB groups based on a data size TBS of the TB. Optionally, one or more preset thresholds may be set in the transmitting end, and the transmitting end may then determine m based on the TBS and the one or more preset thresholds. For related descriptions of this implementation, refer to a manner 3 of "determining the actual value m of the quantity of CB groups" in the description of embodiments.

In a possible design, the dividing a TB into m CB groups may include: determining an actual value m of a quantity of CB groups based on a data size TBS of the TB and a maximum value $CB_{max}$ of a data size of a CB. For related descriptions of this implementation, refer to a manner 6 of "determining the actual value m of the quantity of CB groups" in the description of embodiments.

In a possible design, the dividing a TB into m CB groups may include: determining an actual value m of a quantity of CB groups based on a data size TBS of the TB and a maximum value $CB_{Group\_max}$ of a data size of a CB group. For related descriptions of this implementation, refer to a manner 7 of "determining the actual value m of the quantity of CB groups" in the description of embodiments.

In a possible design, the dividing a TB into m CB groups may include: determining an actual value m of a quantity of CB groups based on a data size TBS of the TB and a maximum value $N_{Group\_max}$ of the quantity of CB groups. For related descriptions of this implementation, refer to a manner 8 of "determining the actual value m of the quantity of CB groups" in the description of embodiments.

The embodiments of the present disclosure provide a plurality of implementations of determining an actual value m of a quantity of CB groups included in one TB. For details, refer to a manner 1 to the manner 11 of "determining the actual value m of the quantity of CB groups" in the description of embodiments. At least the following two categories are included.

In a first category, the reference value $N_{CB\_re}$ of the quantity of CBs obtained by dividing the TB is first determined based on the formula $$N_{CB\_re} = \text{ceil}\left(\frac{TBS}{CB_{max}}\right),$$

and the actual value m of the quantity of CB groups is then determined, such as the manner 1, the manner 6, and the manner 10.

In a second category, the reference value $N_{Group\_re}$ of the quantity of CB groups obtained by dividing the TB is first determined based on the formula $$N_{Group\_re} = \text{ceil}\left(\frac{TBS}{CB_{Group\_max}}\right),$$

and the actual value m of the quantity of CB groups is then determined, such as a manner 2, the manner 7, and the manner 11.

In the manners in the first category, $N_{CB\_re}$ may not be exactly divided by m determined in the manners in the first category. Therefore, quantities of CBs in different CB groups may be different. In a possible design, the method may further include: determining a quantity C of CBs in each CB group based on a formula $$C_+ = \left\lceil \frac{N_{CB\_re}}{m} \right\rceil \text{ or } C_- = \left\lfloor \frac{N_{CB\_re}}{m} \right\rfloor,$$

where $\lceil \ \rceil$ denotes rounding up, $\lfloor \ \rfloor$ denotes rounding down, and C includes $C_+$ and $C_-$. Further, the method may further include: determining, based on a formula $N_+ = N_{CB\_re} - mC_-$, a quantity $N_+$ of CB groups that each have $C_+$ CBs; and determining, based on a formula $N_- = m - N_+$, a quantity $N_-$ of CB groups that each have $C_-$ CBs. This implementation provides a manner of determining a quantity of CBs in a CB group.

In the manners in the second category, the TBS may not be exactly divided by m determined in the manners in the second category. Therefore, quantities of bits included in different CB groups may be different. In a possible design, the method may further include: determining a quantity B of bits in each CB group based on a formula $$B_+ = \left\lceil \frac{TBS}{m} \right\rceil$$

or $B_- = TBS - (m-1)B_+$. This implementation provides a manner of determining a quantity of bits included in a CB group.

According to a second aspect, a data transmission method is provided, including: dividing a TB into m code block CB groups, where m≥2, m is an integer, and a CB group includes at least one CB; mapping encoded and modulated data of the m CB groups to a first time-frequency resource; and sending the data mapped to the first time-frequency resource. In the technical solution, one TB is divided into a plurality of CB groups, and each CB group includes at least one CB. In this way, if a receiving end determines that data of one CB group or data of one or more CBs in one CB group is unsuccessfully transmitted, a transmitting end needs to retransmit the data only of the CB group. Therefore, resources can be saved, and transmission efficiency is improved. For a procedure of determining m, refer to the first aspect. Details are not described herein again.

In a possible design, the method may further include: adding a CRC to each CB group.

In a possible design, the method may further include: adding a CRC to each CB.

In a possible design, the method may further include: dividing each CB group into C CBs, where when a CRC is added to each CB, $C=\text{ceil}(B/(CB_{max}\_CB_{CRC}))$; when no CRC is added to each CB, $C=\text{ceil}(B/CB_{max})$; ceil( ) denotes rounding up, B denotes a data size of the CB group, $CB_{max}$ denotes a maximum value of a data size of a CB, and $CB_{CRC}$ denotes a size of the CRC added to the CB. If no CRC is added to the CB group, the data size B of the CB group is a data size $L_{CBgroup}$ of the CB group. If a CRC is added to the CB group, the data size B of the CB group is a sum of a data size $L_{CBgroup}$ of the CB group and a size $CB_{GroupCRC}$ of the CRC added to the CB group. The possible design provides a method for dividing a CB group into CBs. Specifically, when the CB group is divided into the C CBs, and no CRC is added to the CB, $$C = \text{ceil}\left(\frac{L_{CBgroup}}{CB_{max}}\right);$$

when the CB group is divided into the C CBs, and the CRC is added to the CB, $$C = \text{ceil}\left(\frac{L_{CBgroup}}{CB_{max} - CB_{CRC}}\right);$$

when the CB group and the CRC added to the CB group are divided into the C CBs, and no CRC is added to the CB, $$C = \text{ceil}\left(\frac{L_{CBgroup} + CB_{GroupCRC}}{CB_{max}}\right);$$

or when the CB group and the CRC added to the CB group are divided into the C CBs, and the CRC is added to the CB group, $$C = \text{ceil}\left(\frac{L_{CBgroup} + CB_{GroupCRC}}{CB_{max} - CB_{CRC}}\right).$$

In a possible design, the method may further include: receiving an M-bit HARQ indicator, where each bit of the HARQ indicator is used to indicate whether data of a corresponding CB group is correctly received, and M is a maximum value of a quantity of CB groups or an actual value m of a quantity of CB groups. The possible design provides a method for transmitting a HARQ indicator.

In a possible design, when spatial multiplexing is performed on a plurality of TBs transmitted in one transmission process in a MIMO system, the transmitting end may perform an independent operation on each of the plurality of TBs. In other words, data transmission is performed on each of the plurality of TBs according to the technical solution provided in this application. Alternatively, the transmitting end may perform a joint operation on the plurality of TBs, for example, may determine a uniform division manner based on a TB of the plurality of TBs that has a largest or smallest data size. For example, a TBS used in a process of determining an actual value m of a quantity of CB groups may be determined based on the TB of the plurality of TBs that has the largest or smallest data size. The possible design provides an implementation of dividing a plurality of simultaneously transmitted TBs.

In a possible design, the method may further include: sending control information, where the control information includes at least one of the following information: 1 or N modulation and coding schemes MCSs, 1 or N new data indicators NDIs, and 1 or N redundancy versions RVs. N denotes a maximum value of a quantity of CB groups or an actual value m of a quantity of CB groups. The control information may be downlink control information DCI. The technical solution provides a method for transmitting downlink control information DCI.

In a possible design, if only retransmitted data is transmitted in a current transmission process, information that represents new data and that is in the NDI is meaningless. If new data and retransmitted data are transmitted in a current transmission process, information that represents the new data and the retransmitted data and that is in the NDI is meaningful.

According to a third aspect, a data transmission method is provided, including: receiving control information, where the control information includes information about a transport block TB, the TB includes m code block CB groups, a CB group includes at least one CB, m≥2, and m is an integer; and then obtaining the m CB groups from a first time-frequency resource, and generating data of one TB by concatenating demodulated and decoded data of the m CB groups.

In a possible design, the method may further include: determining an actual value m of a quantity of CB groups. For an implementation process thereof, refer to the first aspect. Details are not described herein again.

In a possible design, the method may further include: feeding back an M-bit hybrid automatic repeat request HARQ indicator, where each bit of the HARQ indicator is used to indicate whether data of a corresponding CB group is correctly received, and M is a maximum value of a quantity of CB groups or an actual value m of a quantity of CB groups. Optionally, when the TB is unsuccessfully decoded (to be specific, a CRC fails), an M-bit NACK indication is fed back.

In a possible design, after the m CB groups are obtained from the first time-frequency resource, the method may further include: dividing data of each CB group into C CBs, where when a cyclic redundancy check CRC is added to each CB, $C=\text{ceil}(B/(CB_{max}\_CB_{CRC}))$; when no CRC is added to each CB, $C=\text{ceil}(B/CB_{max})$; ceil( ) denotes rounding up, B denotes a data size of the CB group, $CB_{max}$ denotes a maximum value of a data size of a CB, and $CB_{CRC}$ denotes a size of the CRC added to the CB. If no CRC is added to the CB group, the data size of the CB group is a data size of the CB group. If a CRC is added to the CB group, the data size of the CB group is a sum of a data size of the CB group and a size of the CRC added to the CB group.

In a possible design, the method may further include: receiving control information, where the control information includes at least one of the following information: 1 or N modulation and coding schemes MCSs, 1 or N new data indicators NDIs, and 1 or N redundancy versions RVs. N denotes a maximum value of a quantity of CB groups or an actual value m of a quantity of CB groups.

It may be understood that, for explanations and advantageous effects of related content of any technical solution provided in the third aspect, reference may be made to a corresponding technical solution in the second aspect.

According to a fourth aspect, a TB division apparatus is provided, configured to perform any TB division method provided in the first aspect. The TB division apparatus includes: a division module, configured to divide a TB into m code block CB groups, where m≥2, m is an integer, and a CB group includes at least one CB.

In a possible design, the division module is specifically configured to determine an actual value m of a quantity of CB groups based on a maximum value $N_{Group\_max}$ of the quantity of CB groups. Optionally, $m=N_{Group\_max}$.

In a possible design, the division module is specifically configured to determine an actual value m of a quantity of CB groups based on a data size TBS of the TB, a maximum value $CB_{max}$ of a data size of a CB, and a maximum value $N_{Group\_max}$ of the quantity of CB groups.

In a possible design, the division module is specifically configured to determine an actual value m of a quantity of CB groups based on a data size TBS of the TB, a maximum value $CB_{Group\_max}$ of a data size of a CB group, and a maximum value $N_{Group\_max}$ of the quantity of CB groups.

In a possible design, the division module is specifically configured to determine an actual value m of a quantity of CB groups based on a data size TBS of the TB.

In a possible design, the division module is specifically configured to determine an actual value m of a quantity of CB groups based on a data size TBS of the TB and a maximum value $CB_{max}$ of a data size of a CB.

In a possible design, the division module is specifically configured to determine an actual value m of a quantity of CB groups based on a data size TBS of the TB and a maximum value $CB_{Group\_max}$ of a data size of a CB group.

In a possible design, the division module is specifically configured to determine an actual value m of a quantity of CB groups based on a data size TBS of the TB and a maximum value $N_{Group\_max}$ of the quantity of CB groups.

In a possible design, if the division module determines, based on a formula $$N_{CB\_re} = \text{ceil}\left(\frac{TBS}{CB_{max}}\right),$$

a reference value $N_{CB\_re}$ of a quantity of CBs obtained by dividing the TB, and then determines an actual value m of a quantity of CB groups, the division module may be further configured to determine a quantity C of CBs in each CB group based on a formula $$C_+ = \left\lceil \frac{N_{CB\_re}}{m} \right\rceil \text{ or } C_- = \left\lfloor \frac{N_{CB\_re}}{m} \right\rfloor,$$

where ⌈ ⌉ denotes rounding up, and ⌊ ⌋ denotes rounding down. Further, the division module may be further configured to: determine, based on a formula $N_+=N_{CB\_re}-mC_-$, a quantity $N_+$ of CB groups that each have $C_+$ CBs; and determine, based on a formula $N_-=m-N_+$, a quantity $N_-$ of CB groups that each have $C_-$ CBs.

In a possible design, if the division module first determines, based on a formula $$N_{Group\_re} = \text{ceil}\left(\frac{TBS}{CB_{Group\_max}}\right),$$

a reference value $N_{Group\_re}$ of a quantity of CB groups obtained by dividing the TB, and then determines an actual value m of the quantity of CB groups, the division module may be further configured to determine a quantity B of bits in each CB group based on a formula $$B_+ = \left\lceil \frac{TBS}{m} \right\rceil$$

or $B_-=TBS-(m-1)B_+$.

It may be understood that, for explanations and advantageous effects of related content of any technical solution provided in the fourth aspect, reference may be made to a corresponding technical solution in the first aspect.

According to a fifth aspect, a data transmission apparatus is provided, configured to perform any data transmission method provided in the second aspect. The data transmission apparatus may include: a division module, a mapping module, and a sending module. The division module is configured to divide a transport block TB into m code block CB groups, where m≥2, m is an integer, and a CB group includes at least one CB. The mapping module is configured to map encoded and modulated data of the m CB groups to a first time-frequency resource. The sending module is configured to send the data mapped to the first time-frequency resource.

For a specific implementation of the division module, refer to the third aspect. Details are not described herein again.

In a possible design, the apparatus may further include: an addition module, configured to add a CRC to each CB group; and/or configured to add a CRC to each CB.

In a possible design, the division module may be further configured to divide each CB group into C CBs, where when a CRC is added to each CB, $C=\text{ceil}(B/(CB_{max}-CB_{CRC}))$; when no CRC is added to each CB, $C=\text{ceil}(B/CB_{max})$; ceil( ) denotes rounding up, B denotes a data size of the CB group, $CB_{max}$ denotes a maximum value of a data size of a CB, and $CB_{CRC}$ denotes a size of the CRC added to the CB. If no CRC is added to the CB group, the data size B of the CB group is a data size $L_{CBgroup}$ of the CB group. If a CRC is added to the CB group, the data size B of the CB group is a sum of a data size $L_{CBgroup}$ of the CB group and a size $CB_{GroupCRC}$ of the CRC added to the CB group.

In a possible design, the apparatus may further include: a receiving module, configured to receive an M-bit automatic repeat request HARQ indicator, where each bit of the HARQ indicator is used to indicate whether data of a corresponding CB group is correctly received, and M is a maximum value of a quantity of CB groups or an actual value m of a quantity of CB groups.

In a possible design, the sending module may be further configured to send control information, where the control information includes at least one of the following information: 1 or N modulation and coding schemes MCSs, 1 or N new data indicators NDIs, and 1 or N redundancy versions RVs. N denotes a maximum value of a quantity of CB groups or an actual value m of a quantity of CB groups. The control information may be downlink control information DCI.

In a possible design, if only retransmitted data is transmitted in a current transmission process, information that represents new data and that is in the NDI is meaningless. If new data and retransmitted data are transmitted in a current transmission process, information that represents the new data and the retransmitted data and that is in the NDI is meaningful.

It may be understood that, for explanations and advantageous effects of related content of any technical solution provided in the fifth aspect, reference may be made to a corresponding technical solution in the second aspect.

According to a sixth aspect, a data transmission apparatus is provided, configured to perform any data transmission method provided in the third aspect. The data transmission apparatus may include: a receiving module and an obtaining module. The receiving module is configured to receive control information, where the control information includes information about a transport block TB, the TB includes m code block CB groups, a CB group includes at least one CB, m≥2, and m is an integer. The obtaining module is configured to: obtain the m CB groups from a first time-frequency resource, and generate data of one TB by concatenating demodulated and decoded data of the m CB groups.

In a possible design, the apparatus may further include: a determining module, configured to determine an actual value m of a quantity of CB groups. For a specific implementation process of the determining module, refer to the functions of the division module in the fourth aspect. Details are not described herein again.

In a possible design, the information about the TB may further include at least one of the following information: 1 or N modulation and coding schemes MCSs, 1 or N new data indicators NDIs, and 1 or N redundancy versions RVs. N denotes a maximum value of a quantity of CB groups or an actual value m of a quantity of CB groups.

In a possible design, the apparatus may further include: a sending module, configured to feed back an M-bit automatic repeat request HARQ indicator, where each bit of the HARQ indicator is used to indicate whether data of a corresponding CB group is correctly received, and M is a maximum value of a quantity of CB groups or an actual value m of a quantity of CB groups. Optionally, when a CRC of the TB fails, an M-bit NACK indication is fed back.

Optionally, when M is the maximum value of the quantity of CB groups, only the first m bits are valid, or only the first m bits are used to indicate whether the data of the corresponding CB group is correctly received. During specific implementation, the present disclosure is certainly not limited thereto.

In a possible design, the apparatus may further include: a division module, configured to divide data of each CB group into C CBs, where when a cyclic redundancy check CRC is added to each CB, C=ceil(B/($CB_{max}$−$CB_{CRC}$); when no CRC is added to each CB, C=ceil(B/$CB_{max}$); ceil( ) denotes rounding up, B denotes a data size of the CB group, $CB_{max}$ denotes a maximum value of a data size of a CB, and $CB_{CRC}$ denotes a size of the CRC added to the CB. If no CRC is added to the CB group, the data size of the CB group is a data size of the CB group. If a CRC is added to the CB group, the data size of the CB group is a sum of a data size of the CB group and a size of the CRC added to the CB group.

It may be understood that, for explanations and advantageous effects of related content of any technical solution provided in the sixth aspect, reference may be made to a corresponding technical solution in the third aspect.

In any one of the foregoing aspects or any possible design provided in any one of the aspects, the data mapped to the first time-frequency resource includes at least one of new data and retransmitted data. The new data includes the foregoing TB.

According to a seventh aspect, a TB division apparatus is provided. The apparatus may be a transmitting end, or may be a receiving end. The apparatus may implement the functions executed in the example of the TB division method provided in the first aspect. The functions may be implemented by using hardware, or may be implemented by using hardware executing corresponding software. The hardware or software includes one or more modules corresponding to the foregoing functions.

In a possible design, a structure of the apparatus includes a processor, a system bus, and a communication interface. The processor is configured to support the apparatus in execution of a corresponding function in the method provided in the first aspect. The communication interface is configured to support communication between the apparatus and another network element. The apparatus may further include a memory. The memory is configured to be coupled to the processor, and stores a necessary program instruction and necessary data of the apparatus. The communication interface may be specifically a transceiver.

According to an eighth aspect, a data transmission apparatus is provided. The apparatus may be a transmitting end. The apparatus may implement the functions executed in the example of the data transmission method provided in the second aspect. The functions may be implemented by using hardware, or may be implemented by using hardware executing corresponding software. The hardware or software includes one or more modules corresponding to the foregoing functions.

In a possible design, a structure of the apparatus includes a processor, a system bus, and a communication interface. The processor is configured to support the apparatus in execution of a corresponding function in the method provided in the second aspect. The communication interface is configured to support communication between the apparatus and another network element (for example, a receiving end). The apparatus may further include a memory. The memory is configured to be coupled to the processor, and stores a necessary program instruction and necessary data of the apparatus. The communication interface may be specifically a transceiver.

According to a ninth aspect, a data transmission apparatus is provided. The apparatus may be a receiving end. The apparatus may implement the functions executed in the example of the data transmission method provided in the third aspect. The functions may be implemented by using hardware, or may be implemented by using hardware executing corresponding software. The hardware or software includes one or more modules corresponding to the foregoing functions.

In a possible design, a structure of the apparatus includes a processor, a system bus, and a communication interface. The processor is configured to support the apparatus in execution of a corresponding function in the method provided in the third aspect. The communication interface is configured to support communication between the apparatus and another network element (for example, a receiving end). The apparatus may further include a memory. The memory is configured to be coupled to the processor, and stores a necessary program instruction and necessary data of the apparatus. The communication interface may be specifically a transceiver.

According to a tenth aspect, a computer storage medium is provided, configured to store a computer software instruction corresponding to the TB division method provided in the first aspect. The computer storage medium and the computer software instruction include a designed program used to perform the seventh aspect.

According to an eleventh aspect, a computer storage medium is provided, configured to store a computer software instruction corresponding to the data transmission method provided in the second aspect. The computer storage medium and the computer software instruction include a designed program used to perform the eighth aspect.

According to a twelfth aspect, a computer storage medium is provided, configured to store a computer software instruction corresponding to the data transmission method provided in the third aspect. The computer storage medium and the computer software instruction include a designed program used to perform the ninth aspect.

According to a thirteenth aspect, a computer program product including an instruction is provided, where when the computer program product runs on a computer, the computer performs any TB division method provided in the first aspect.

According to a fourteenth aspect, a computer program product including an instruction is provided, where when the computer program product runs on a computer, the computer performs any data transmission method provided in the second aspect.

According to a fifteenth aspect, a computer program product including an instruction is provided, where when the computer program product runs on a computer, the computer performs any data transmission method provided in the third aspect.

It may be understood that any data transmission apparatus, any computer storage medium, or any computer program product provided above is configured to perform a corresponding method provided above. Therefore, for advantageous effects that can be achieved by any data transmission apparatus, any computer storage medium, or any computer program product, refer to advantageous effects in a corresponding method provided above. Details are not described herein again.

Another technical solution provided in this application is provided below.

Currently, a resource mapping procedure includes: Each CB on which operations such as encoding and rate matching are performed is successively mapped to a time-frequency resource according to a rule of frequency domain first and time domain next. In this way, if interference occurs in a data transmission process, the interference affects accuracy of data of a plurality of CB groups. Therefore, the data of the plurality of CB groups may all need to be retransmitted. Consequently, transmission efficiency is reduced. The following technical solutions are used in the embodiments of the present disclosure to achieve the foregoing objective.

According to a first aspect, a data transmission method is provided, including: dividing a TB into m CB groups, where m≥2, m is an integer, each of the m CB groups includes at least one CB; and then mapping encoded and modulated data of the m CB groups to a first time-frequency resource, and next sending the data mapped to the first time-frequency resource, where the first time-frequency resource includes n CB container units CCUs, the CCUs are some time-frequency resources of the first time-frequency resource, and no time-frequency resources are overlapped between different CCUs; data of different CB groups is mapped to different CCUs; the data of the different CB groups is overlapped in frequency domain and is not overlapped in time domain, or the data of the different CB groups is overlapped in time domain and is not overlapped in frequency domain; n≥m and n is an integer. In the technical solution, the time-frequency resource (that is, the first time-frequency resource) allocated during current transmission may be divided into a plurality of CCUs according to a rule, and the one currently transmitted TB is then divided into the plurality of CB groups. Then, the encoded and modulated data of the plurality of CB groups is mapped to corresponding CCUs, so that the data of the different CB groups is not overlapped in time domain or is not overlapped in frequency domain. In this way, if the data of the different CB groups is not overlapped in time domain, when a symbol is interfered with, the interference affects accuracy of data only of one CB group. Therefore, the data of only the CB group needs to be retransmitted. Compared with the prior art, transmission efficiency is improved. If the data of the different CB groups is not overlapped in frequency domain, when a narrowband is interfered with in a process of transmitting the currently transmitted data, compared with the prior art, the interference affects a smaller quantity of CB groups. Therefore, fewer CB groups need to be retransmitted, and transmission efficiency is improved.

According to a second aspect, a data transmission apparatus is provided. The apparatus includes: a division module, a mapping module, and a sending module. The division module is configured to divide a transport block TB into m code block CB groups, where m≥2, m is an integer, and each of the m CB groups includes at least one CB. The mapping module is configured to map encoded and modulated data of the m CB groups to a first time-frequency resource, where the first time-frequency resource includes n CB container units CCUs, the CCUs are some time-frequency resources of the first time-frequency resource, and no time-frequency resources are overlapped between different CCUs; data of different CB groups is mapped to different CCUs; the data of the different CB groups is overlapped in frequency domain and is not overlapped in time domain, or the data of the different CB groups is overlapped in time domain and is not overlapped in frequency domain; n≥m and n is an integer. The sending module is configured to send the data mapped to the first time-frequency resource. For advantageous effects of the technical solution, refer to the foregoing.

In a possible design, the dividing a TB into m CB groups in the first aspect may include: determining an actual value m of a quantity of CB groups based on at least one of a data size of the TB, a maximum value of a data size of a CB, a maximum value of a data size of a CB group, a maximum value of the quantity of CB groups, and the quantity n of CCUs. Optionally, the foregoing step in the possible design may include: determining a reference value of the quantity of CB groups based on the data size of the TB and the maximum value of the data size of the CB; and then using, as the actual value m of the quantity of CB groups, a smallest value in the reference value of the quantity of CB groups, the maximum value of the quantity of CB groups, and the quantity n of CCUs.

Correspondingly, the division module in the second aspect may be specifically configured to determine an actual value m of a quantity of CB groups based on at least one of a data size of the TB, a maximum value of a data size of a CB, a maximum value of a data size of a CB group, a maximum value of the quantity of CB groups, and the quantity n of CCUs. Optionally, the division module may be specifically configured to: determine a reference value of the quantity of CB groups based on the data size of the TB and the maximum value of the data size of the CB; and then use, as the actual value m of the quantity of CB groups, a smallest value in the reference value of the quantity of CB groups, the maximum value of the quantity of CB groups, and the quantity n of CCUs.

Before transmitting data each time, a transmitting end usually needs to determine a data size of a TB that can be currently transmitted. A specific manner of determining the data size is not limited herein. For example, for the specific manner of determining the data size, refer to the prior art. The maximum value of the data size of the CB and the maximum value of the quantity of CB groups may be usually preset.

In a possible design, before the dividing a TB into m CB groups in the first aspect, the method provided in the first aspect may further include: determining a mapping relationship between each of the m CB groups and each of the n CCUs based on the actual value m of the quantity of CB groups and the quantity n of CCUs; and then determining a data size of each of the m CB groups based on the mapping relationship and a size of a resource that can be used to transmit data and that is in the n CCUs. Optionally, the determining a data size of each of the m CB groups based on the mapping relationship and a size of a resource that can be used to transmit data and that is in the n CCUs may include: determining a data size of an $i^{th}$ CB group of the m CB groups based on the following formula ①:

$$B_i = \begin{cases} \text{floor}\left((L_{TB} + L_{TB\_CRC}) * \frac{S_{CB\_i}}{S_{total}}\right) & i = 1, 2 \ldots, m-1 \\ L_{TB} + L_{TB\_CRC} - \sum_{i=1}^{m-1} B_i & i = m \end{cases} \quad \text{Formula ①}$$

where $B_i$ denotes the data size of the $i^{th}$ CB group of the m CB groups, $1 \le i \le m$, and i is an integer; $L_{TB}$ denotes the data size of the TB, $L_{TB\_CRC}$ denotes a size of a cyclic redundancy check CRC added to the TB, $L_{TB\_CRC} \ge 0$, $S_{CB\_i}$ denotes a size of a resource that can be used to transmit data and that is in a CCU corresponding to the $i^{th}$ CB group, $S_{total}$ denotes the size of the resource that can be used to transmit data and that is in the n CCUs, and floor ( ) denotes rounding down.

Correspondingly, the apparatus provided in the second aspect may further include a determining module. The determining module is configured to: determine a mapping relationship between each of the m CB groups and each of the n CCUs based on the actual value m of the quantity of CB groups and the quantity n of CCUs; and then determine a data size of each of the m CB groups based on the mapping relationship and a size of a resource that can be used to transmit data and that is in the n CCUs. Optionally, the determining module may be specifically configured to determine a data size of an $i^{th}$ CB group of the m CB groups based on the formula ①.

The possible design manner can ensure, to the greatest extent, that the data of the m CB groups can be as uniformly as possible distributed on the n CCUs, so that a bit rate, which is obtained after encoding and rate matching are performed, of each CB group is basically consistent, and AMC is normally performed.

In a possible design, the method provided in the first aspect may further include: dividing data of each CB group into C CBs. Correspondingly, the division module in the second aspect may be further configured to divide data of each CB group into C CBs. When a CRC is added to each CB, $C=\text{ceil}(B/(CB_{max}-CB_{CRC})$; when no CRC is added to each CB, $C=\text{ceil}(B/CB_{max})$; ceil( ) denotes rounding up, B denotes the data size of the CB group, $CB_{max}$ denotes the maximum value of the data size of the CB, and $CB_{CRC}$ denotes a size of the CRC added to the CB.

In a possible design, information about the TB includes the data size of the TB.

According to a third aspect, a data transmission method is provided, including: receiving control information, where the control information includes information about a transport block TB; receiving the TB mapped to a first time-frequency resource, where the first time-frequency resource includes n CB container units CCUs, the CCUs are some time-frequency resources of the first time-frequency resource, and no time-frequency resources are overlapped between different CCUs; the TB includes m code block CB groups, and each of the m CB groups includes at least one CB; data of different CB groups is overlapped in frequency domain and is not overlapped in time domain, or data of different CB groups is overlapped in time domain and is not overlapped in frequency domain; $m \ge 2$, m is an integer, $n \ge m$, and n is an integer; determining a mapping relationship between each of the m CB groups and each of the n CCUs; and obtaining the m CB groups from the first time-frequency resource based on the mapping relationship, and generating data of one TB by concatenating demodulated and decoded data of the m CB groups.

According to a fourth aspect, a data transmission apparatus is provided, including: a receiving module, configured to: receive control information, where the control information includes information about a transport block TB; and receive the TB mapped to a first time-frequency resource, where the first time-frequency resource includes n CB container units CCUs, the CCUs are some time-frequency resources of the first time-frequency resource, and no time-frequency resources are overlapped between different CCUs; the TB includes m code block CB groups, each of the m CB groups includes at least one CB, and data of different CB groups is mapped to different CCUs; the data of the different CB groups is overlapped in frequency domain and is not overlapped in time domain, or the data of the different CB groups is overlapped in time domain and is not overlapped in frequency domain; $m \ge 2$, m is an integer, $n \ge m$, and n is an integer; a determining module, configured to determine a mapping relationship between each of the m CB groups and each of the n CCUs; and an obtaining module, configured to: obtain the m CB groups from the first time-frequency resource based on the mapping relationship, and generate data of one TB by concatenating demodulated and decoded data of the m CB groups.

In a possible design, after the receiving control information in the third aspect, the method provided in the third aspect may further include: determining an actual value m of a quantity of CB groups based on at least one of a data size of the TB, a maximum value of a data size of a CB, a maximum value of a data size of a CB group, a maximum value of the quantity of CB groups, and the quantity n of CCUs. Optionally, the foregoing step in the possible design may include: determining a reference value of the quantity of CB groups based on the data size of the TB and the maximum value of the data size of the CB; and using, as the actual value m of the quantity of CB groups, a smallest value in the reference value of the quantity of CB groups, the maximum value of the quantity of CB groups, and the quantity n of CCUs.

Correspondingly, the determining module in the fourth aspect may be further configured to determine an actual value m of a quantity of CB groups based on at least one of a data size of the TB, a maximum value of a data size of a CB, a maximum value of a data size of a CB group, a maximum value of the quantity of CB groups, and the quantity n of CCUs. Optionally, the determining module may be specifically configured to: determine a reference value of the quantity of CB groups based on the data size of the TB and the maximum value of the data size of the CB; and use, as the actual value m of the quantity of CB groups, a smallest value in the reference value of the quantity of CB groups, the maximum value of the quantity of CB groups, and the quantity n of CCUs.

In a possible design, the determining a mapping relationship between each of the m CB groups and each of the n CCUs in the third aspect may include: determining the mapping relationship between each of the m CB groups and each of the n CCUs based on the actual value m of the quantity of CB groups and the quantity n of CCUs.

Correspondingly, the determining module in the fourth aspect may be specifically configured to determine the mapping relationship between each of the m CB groups and each of the n CCUs based on the actual value m of the quantity of CB groups and the quantity n of CCUs.

In a possible design, after the determining a mapping relationship between each of the m CB groups and each of the n CCUs in the third aspect, the method provided in the third aspect may further include: determining a data size of each of the m CB groups based on the mapping relationship and a size of a resource that can be used to transmit data and that is in the n CCUs. Optionally, the data size of each of the m CB groups is determined based on the formula ①.

Correspondingly, the determining module in the fourth aspect may be further configured to determine a data size of each of the m CB groups based on the mapping relationship and a size of a resource that can be used to transmit data and that is in the n CCUs. Optionally, the determining module may be specifically configured to determine the data size of each of the m CB groups based on the formula ①.

In a possible design, after the obtaining the m CB groups from the first time-frequency resource based on the mapping relationship in the third aspect, the method provided in the third aspect may further include: dividing data of each CB group into C CBs. Correspondingly, the apparatus provided in the fourth aspect may further include: a division module, configured to divide data of each CB group into C CBs. For how to determine a value of C, refer to the foregoing.

In any one of the foregoing aspects or any possible design provided in any one of the aspects, the data mapped to the first time-frequency resource includes at least one of new data and retransmitted data. The new data includes the foregoing TB.

According to a fifth aspect, a data transmission apparatus is provided. The apparatus may be a transmitting end. The apparatus may implement the functions executed in the example of the data transmission method provided in the first aspect. The functions may be implemented by using hardware, or may be implemented by using hardware executing corresponding software. The hardware or software includes one or more modules corresponding to the foregoing functions.

In a possible design, a structure of the apparatus includes a processor, a system bus, and a communication interface. The processor is configured to support the apparatus in execution of a corresponding function in the method provided in the first aspect. The communication interface is configured to support communication between the apparatus and another network element (for example, a receiving end). The apparatus may further include a memory. The memory is configured to be coupled to the processor, and stores a necessary program instruction and necessary data of the apparatus. The communication interface may be specifically a transceiver.

According to a sixth aspect, a computer storage medium is provided, configured to store a computer software instruction corresponding to the data transmission method provided in the first aspect. The computer storage medium and the computer software instruction include a designed program used to perform the fifth aspect.

According to a seventh aspect, a data transmission apparatus is provided. The apparatus may be a receiving end. The apparatus may implement the functions executed in the example of the data transmission method provided in the third aspect. The functions may be implemented by using hardware, or may be implemented by using hardware executing corresponding software. The hardware or software includes one or more modules corresponding to the foregoing functions.

In a possible design, a structure of the apparatus includes a processor, a system bus, and a communication interface. The processor is configured to support the apparatus in execution of a corresponding function in the method provided in the third aspect. The communication interface is configured to support communication between the apparatus and another network element (for example, a transmitting end).

The apparatus may further include a memory. The memory is configured to be coupled to the processor, and stores a necessary program instruction and necessary data of the apparatus. The communication interface may be specifically a transceiver.

According to an eighth aspect, a computer storage medium is provided, configured to store a computer software instruction corresponding to the data transmission method provided in the third aspect. The computer storage medium and the computer software instruction include a designed program used to perform the sixth aspect.

According to a ninth aspect, a computer program product including an instruction is provided, where when the computer program product runs on a computer, the computer performs any data transmission method provided in the first aspect.

According to a tenth aspect, a computer program product including an instruction is provided, where when the computer program product runs on a computer, the computer performs any data transmission method provided in the third aspect.

It may be understood that any data transmission apparatus, any computer storage medium, or any computer program product provided above is configured to perform a corresponding method provided above. Therefore, for advantageous effects that can be achieved by any data transmission apparatus, any computer storage medium, or any computer program product, refer to advantageous effects in a corresponding method provided above. Details are not described herein again.

DESCRIPTION OF EMBODIMENTS

Figure 1:
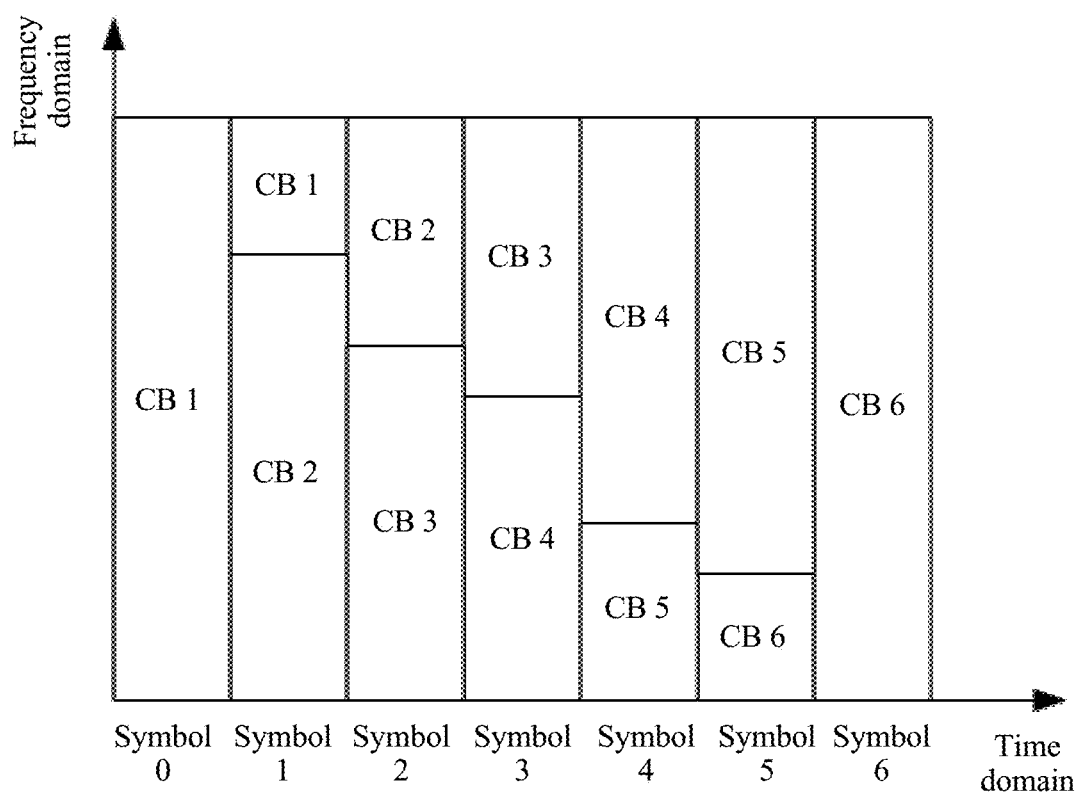
FIG. 1 is a schematic diagram of mapping a resource in the prior art.

FIG. 1 is a schematic diagram of mapping a resource. In FIG. 1, a horizontal axis represents time domain, and a vertical axis represents frequency domain. A time domain resource allocated in a current transmission process is shown in time domain, and is specifically one slot (slot), and the slot includes seven symbols: a symbol 0 to a symbol 6. A frequency domain resource allocated in the current transmission process is shown in frequency domain. In FIG. 1, description is provided by using an example in which a TB transmitted in the current transmission process includes six CBs: a CB 1 to a CB 6. Assuming that the CB 1 to the CB 3 form a CB group 1, and the CB 4 to the CB 6 form a CB group 2, transmission efficiency is reduced in a resource mapping manner shown in FIG. 1 and in scenarios shown in the following solutions 1 and 2. Specifically:

Solution 1: Data of a plurality of CB groups may be mapped to one symbol. In this case, if the symbol is interfered with in a data transmission process, the interference affects accuracy of the data, which is mapped to the symbol, of the plurality of CB groups. Therefore, the data of the plurality of CB groups may all need to be retransmitted. Consequently, transmission efficiency is reduced. For example, if a time-frequency resource subject to the interference is shown in a dashed-line box 1 in FIG. 2, that is, a symbol 3 is interfered with, the interference affects accuracy of data of the CB 3 and data of the CB 4, that is, affects accuracy of data of the CB group 1 and data of the CB group 2. Therefore, the data of the CB group 1 and the data of the CB group 2 may both need to be retransmitted. Consequently, transmission efficiency is reduced.

Solution 2: Data of all CB groups may be mapped to narrow bandwidth. In this case, if the narrow bandwidth is interfered with in a data transmission process, the interference affects accuracy of the data of all the CB groups. Therefore, the data of all the CB groups may need to be retransmitted. Consequently, transmission efficiency is reduced. For example, if a time-frequency resource subject to the interference is shown in a dashed-line box 2 in FIG. 2, that is, the narrow bandwidth allocated in the current transmission process is interfered with, the interference affects accuracy of data of the CB 1 to the CB 6, that is, affects accuracy of data of the CB group 1 and data of the CB group 2. Therefore, the data of the CB group 1 and the data of the CB group 2 may both need to be retransmitted. Consequently, transmission efficiency is reduced.

Figure 2:
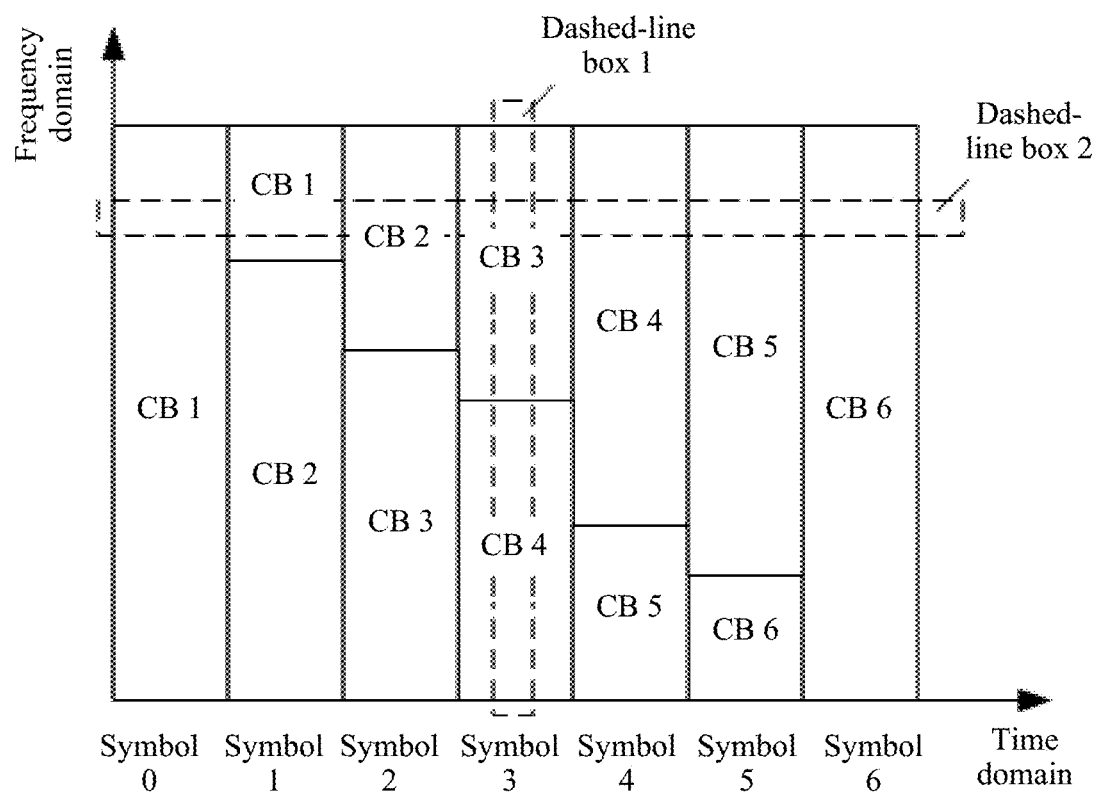
FIG. 2 is a schematic diagram of an interference scenario provided based on FIG. 1.

Based on this, embodiments of the present disclosure provide a data transmission method and apparatus. A basic principle of the data transmission method and apparatus is: A time-frequency resource allocated during current transmission is divided into a plurality of CCUs according to a rule, and one currently transmitted TB is then divided into a plurality of CB groups. Then, encoded and modulated data of the plurality of CB groups is mapped to corresponding CCUs, so that data of different CB groups is not overlapped in time domain or is not overlapped in frequency domain. In this way, if the data of the different CB groups is not overlapped in time domain, in a transmission process, when currently transmitted data is subject to the interference shown in the dashed-line box 1 in FIG. 2, the interference affects accuracy of data only of one CB group. Therefore, the data of only the CB group needs to be retransmitted. Compared with the prior art, transmission efficiency is improved. If the data of the different CB groups is not overlapped in frequency domain, in a transmission process, when currently transmitted data is subject to the interference shown in the dashed-line box 2 in FIG. 2, compared with the prior art, the interference affects a smaller quantity of CB groups. Therefore, fewer CB groups need to be retransmitted, and transmission efficiency is improved.

Figure 3:
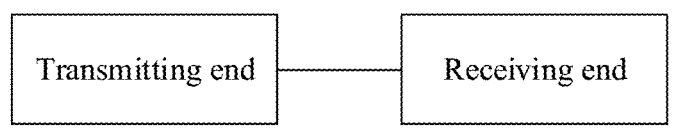
FIG. 3 is a schematic diagram of another interference scenario provided based on FIG. 1.

Technical solutions provided in the embodiments of the present disclosure may be applied to a system architecture shown in FIG. 3. The system architecture shown in FIG. 3 includes: a transmitting end and a receiving end. Both the transmitting end and the receiving end may include, but are not limited to, a base station, user equipment, and the like.

The technical solutions provided in the embodiments of the present disclosure may be applied to various communication systems, such as a current 4G communication system and a future evolved network, for example, a 5G communication system. For example, the various communication systems are a Long Term Evolution (LTE) system, a cellular system related to the 3rd Generation Partnership Project (3GPP), and another communication system of this type. It should be noted that an application scenario in a 5G standard may include, but is not limited to, a scenario of communication between user equipments, a scenario of communication between base stations, a scenario of communication between a base station and user equipment, and the like. Alternatively, the technical solutions provided in the embodiments of the present disclosure may be applied to scenarios such as communication between user equipments and communication between base stations in the 5G communication system.

Some content in this application is briefly described below, so as to help a reader understand.

A first time-frequency resource is a time-frequency resource allocated in a current transmission process. Neither a size of a time-frequency resource allocated in each transmission process nor how to determine the size of the time-frequency resource allocated in each transmission process is limited in the embodiments of the present disclosure. Sizes of time-frequency resources allocated in any two transmission processes may be equal or may be not equal. For example, a time domain resource allocated in one transmission process may be a transmission time interval (TTI) in the LTE system, a symbol-level short TTI, or a short TTI that has a large subcarrier spacing and that is in a high frequency system, or may be a slot or a mini-slot in the 5G system. This is not limited in the embodiments of the present disclosure.

A CCU, that is, a CB container unit, is some time domain resources used in one transmission process. A size of the CCU is not limited in the embodiments of the present disclosure. No time-frequency resources are overlapped between different CCUs. Sizes of different CCUs may be equal or may be not equal.

A manner of configuring a CCU, that is, a manner of dividing, into a plurality of CCUs, a time-frequency resource allocated in one transmission process, is not limited in the embodiments of the present disclosure. For example, the CCU may be dynamically, semi-statically, or statically configured. For example, the CCU may be configured based on a scheduling feature of a currently scheduled service. For example, if an ultra-reliable and low latency communications (URLLC) service needs to be scheduled in a process of scheduling an enhanced mobile broadband (eMBB) service, the CCU may be configured based on a scheduling feature of the URLLC service. The scheduling feature of the URLLC service may include: a size, a location, and the like of a time-frequency resource allocated when the URLLC service is scheduled.

Implementations of dividing a first time-frequency resource into a plurality of CCUs are described below by using examples.

Manner 1: A first time-frequency resource is divided into a plurality of CCUs by dividing a time domain resource. Specifically, the time domain resource may be divided by using any time domain resource granularity. For example, the time domain resource is divided by using an integer multiple of one symbol as a granularity.

Figure 4:
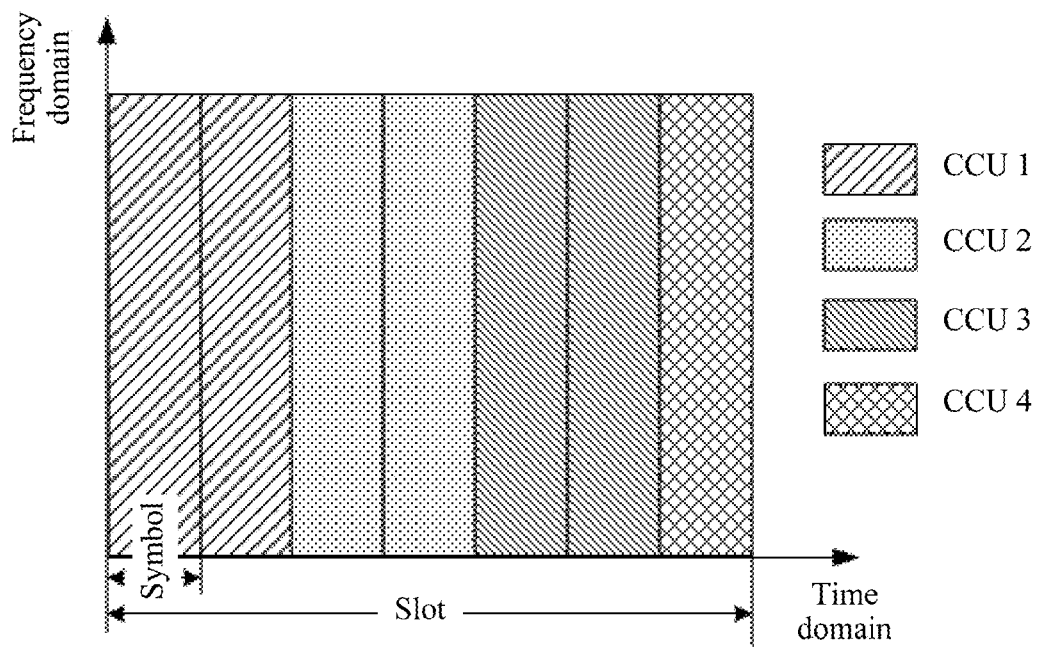
FIG. 4 is a schematic diagram of dividing a first time-frequency resource according to an embodiment of the present disclosure.

For example, if the time domain resource of the first time-frequency resource is one slot, the time domain resource may be divided by using a mini-slot, a symbol, or the like as a granularity, to divide the first time-frequency resource into the plurality of CCUs. FIG. 4 is a schematic diagram of dividing a first time-frequency resource. In FIG. 4, a horizontal axis represents time domain, and a vertical axis represents frequency domain. An example in which one slot includes seven symbols and the slot is divided into four parts is used in FIG. 4 for description. In this case, each of the first three parts may include two symbols, and the last one part includes one symbol. If the time domain resource of the first time-frequency resource is a plurality of slots, the time domain resource may be divided by using a slot, a mini-slot, a symbol, or the like as a granularity, to divide the first time-frequency resource into the plurality of CCUs.

Manner 2: A first time-frequency resource is divided into a plurality of CCUs by dividing a frequency domain resource. Specifically, the frequency domain resource may be divided by using any frequency domain resource granularity. For example, the frequency domain resource is continuously divided or discretely divided by using an integer multiple of one resource element (RE) or an integer multiple of one resource block (RB) as a granularity. Continuously dividing the frequency domain resource may include continuously and uniformly dividing the frequency domain resource. Discretely dividing the frequency domain resource may include discretely and uniformly dividing the frequency domain resource, discretely dividing the frequency domain resource with an equal interval, or the like. It should be noted that, after encoded and modulated data is subsequently mapped to a time-frequency resource, a frequency domain diversity gain can be obtained by discretely dividing the frequency domain resource.

The term "plurality of" in this specification means two or more. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually represents an "or" relationship between the associated objects, and the character "/" in a formula represents a "division" relationship between the associated objects.

Figure 5:
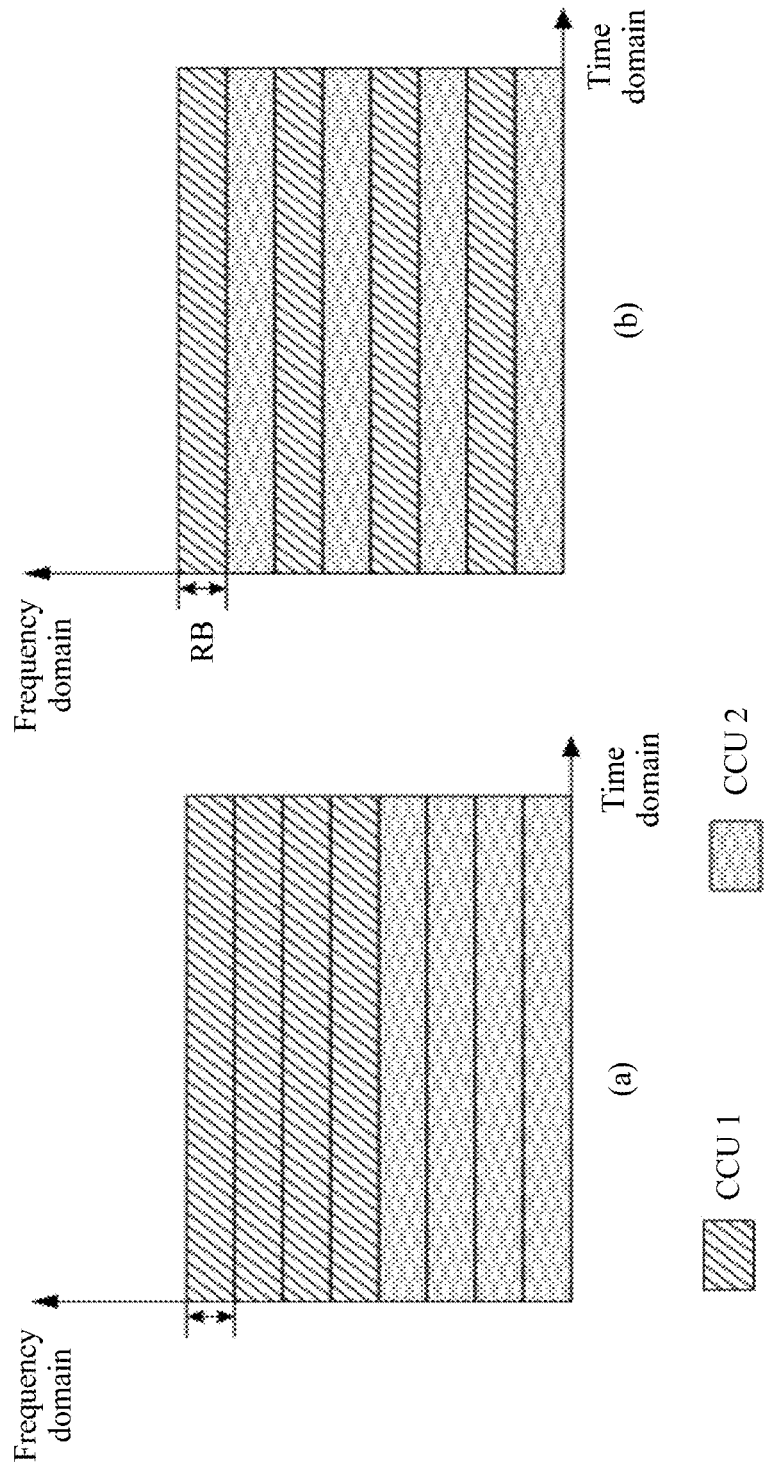
FIG. 5 is another schematic diagram of dividing a first time-frequency resource according to an embodiment of the present disclosure.

FIG. 5 is a schematic diagram of dividing a first time-frequency resource. In FIG. 5, a horizontal axis represents time domain, and a vertical axis represents frequency domain. An example in which a frequency domain resource of the first time-frequency resource includes eight RBs, and the frequency domain resource is divided into two parts is used in FIG. 5 for description. In this case, each part may include four RBs. The four RBs in each part may be continuous, as shown in (a) in FIG. 5; or may be discrete, as shown in (b) in FIG. 5.

Manner 3: A first time-frequency resource is divided into a plurality of CCUs by dividing a time domain resource and a frequency domain resource. The manner 3 is a combination of the manner 1 and the manner 2. For related descriptions thereof, refer to the foregoing.

Figure 6:
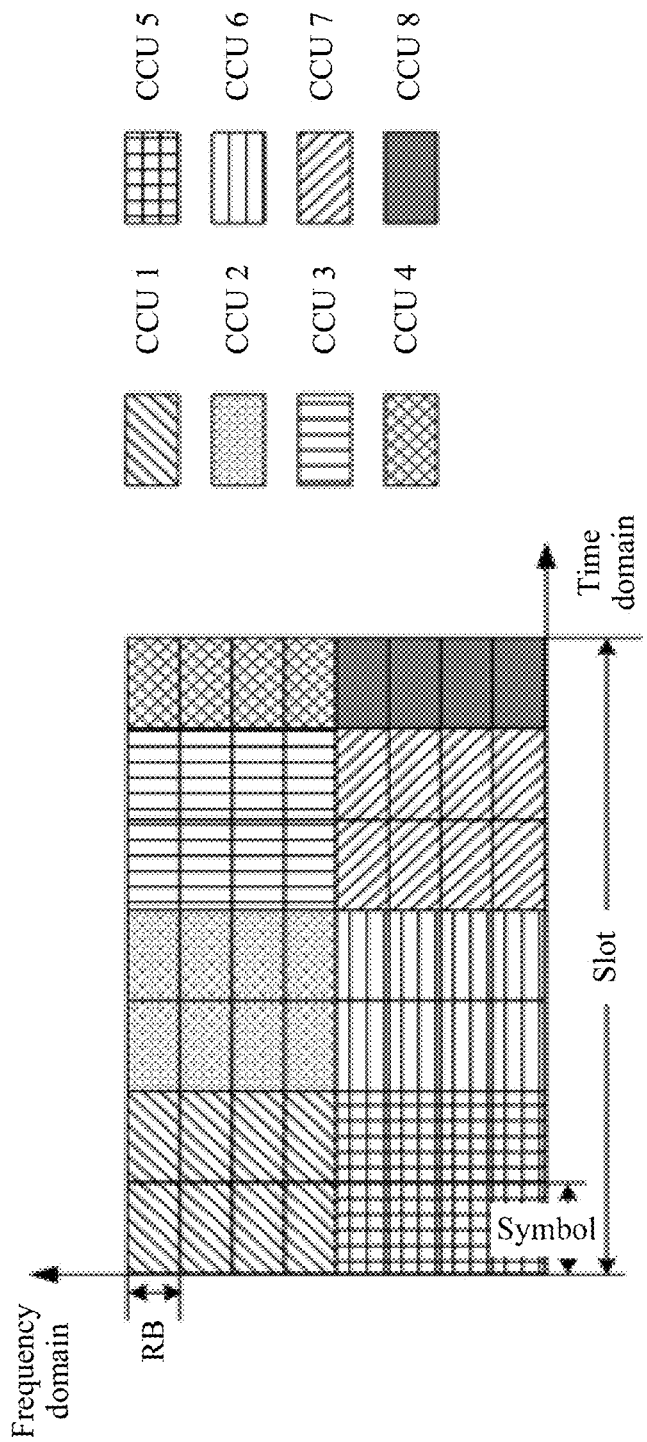
FIG. 6 is another schematic diagram of dividing a first time-frequency resource according to an embodiment of the present disclosure.

FIG. 6 is a schematic diagram of dividing a first time-frequency resource. In FIG. 6, a horizontal axis represents time domain, and a vertical axis represents frequency domain. FIG. 6 is drawn based on (a) in FIG. 5 and FIG. 4. A time-frequency resource of each shadow part in FIG. 6 represents one CCU.

It should be noted that a symbol in a slot described in the embodiments of the present disclosure may include the following two definitions.

(1) The symbol in the slot is a symbol defined in a frame structure. For example, one slot may include seven symbols or 14 symbols.

(2) The symbol in the slot is a symbol that is used to carry data and that is in the slot. In some frame format designs, the symbol in the slot is not totally the symbol (that is, a data symbol) used to carry data. For example, one or more start symbols in the slot are symbols (that is, control symbols) used to carry downlink control information, one or more end symbols are symbols (that is, control symbols) used to carry uplink control information, and there are an intermediate symbol (that is, a GP symbol) used to transmit a guard period (GP) required for switching from downlink to uplink, and an intermediate symbol (that is, a reference symbol) used to transmit reference information. In this case, a symbol in a slot shown in the accompanying drawings in the specification of this application is a data symbol in the slot, that is, a symbol in the slot except a control symbol, a GP symbol, a reference symbol, and the like that are not the data symbol.

In addition, it should be noted that any one of the foregoing CCU configuration rules may be agreed by a transmitting end and a receiving end in advance, or may be indicated by a transmitting end to a receiving end by using signaling.

The technical solutions in the embodiments of the present disclosure are described below by using examples with reference to the accompanying drawings in the embodiments of the present disclosure. Obviously, the described embodiments are merely some but not all of the embodiments of the present disclosure.

Figure 7:
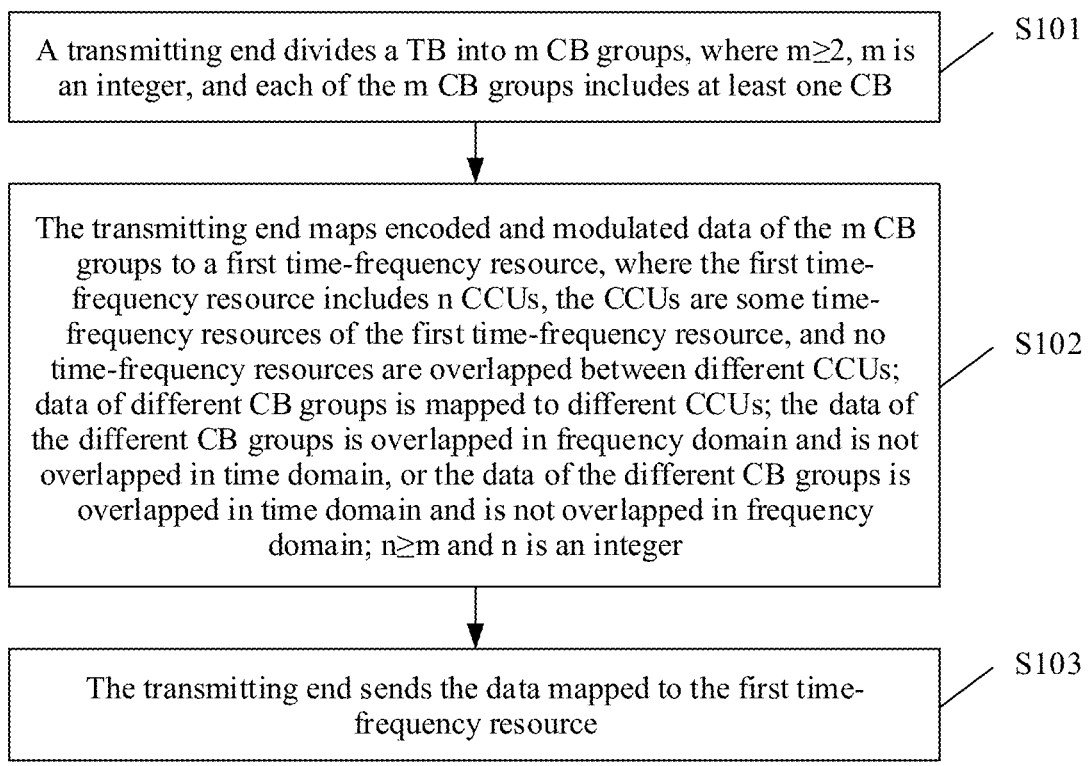
FIG. 7 is a schematic flowchart of a data transmission method according to an embodiment of the present disclosure.

FIG. 7 is a schematic flowchart of a data transmission method according to an embodiment of the present disclosure. The method shown in FIG. 7 may include the following steps S101 to S103.

S101: A transmitting end divides a TB into m CB groups, where m≥2, m is an integer, and each of the m CB groups includes at least one CB.

Specifically, if no CRC is added to the TB, the transmitting end divides the TB into the m CB groups. If a CRC is added to the TB, the transmitting end divides, into the m CB groups, a whole of the TB and the CRC added to the TB. New data, or new data and retransmitted data may be transmitted in a current transmission process. The new data includes the TB. Alternatively, only the retransmitted data may be transmitted in another transmission process. For descriptions of the retransmitted data, refer to the following.

Before S101, the method may further include: determining, by the transmitting end, a size of the TB, and then obtaining data of the TB. If only the new data is transmitted in the current transmission process, the transmitting end may determine, based on a size of a time-frequency resource (that is, the following first time-frequency resource) allocated in the current transmission process, a size of a TB that can be currently transmitted. If the new data and the retransmitted data are transmitted in the current transmission process, the transmitting end may determine, based on a size of a time-frequency resource that can be used to transmit the new data and that is in the time-frequency resource (that is, the following first time-frequency resource) allocated in the current transmission process, a size of a TB that can be currently transmitted. The time-frequency resource that can be used to transmit the new data may be a difference between the time-frequency resource allocated in the current transmission process and a time-frequency resource occupied by the retransmitted data.

It should be noted that, compared with the TB, a CB group in this embodiment of the present disclosure may also be referred to as a small TB, a sub-TB, or the like. In addition, during specific implementation, the transmitting end may alternatively divide the TB into one CB group. In this case, the CB group has the same meaning as that of the TB.

S102: The transmitting end maps encoded and modulated data of the m CB groups to a first time-frequency resource, where the first time-frequency resource includes n CCUs, the CCUs are some time-frequency resources of the first time-frequency resource, and no time-frequency resources are overlapped between different CCUs; data of different CB groups is mapped to different CCUs; the data of the different CB groups is overlapped in frequency domain and is not overlapped in time domain, or the data of the different CB groups is overlapped in time domain and is not overlapped in frequency domain; n≥m and n is an integer.

The first time-frequency resource is the time-frequency resource allocated in the current transmission process, and the data mapped to the first time-frequency resource is data transmitted in the current transmission process.

The data of the m CB groups is all mapped to then CCUs. If only the new data is transmitted in the current transmission process, the first time-frequency resource may include only the n CCUs. If the new data and the retransmitted data are transmitted in the current transmission process, in addition to the n CCUs, the first time-frequency resource may further include the time-frequency resource occupied by the retransmitted data. A manner of configuring a CCU occupied by the retransmitted data transmitted in the current transmission process may be the same as or may be different from a manner of configuring a CCU occupied by the new data transmitted in the current transmission process. For details, refer to the following.

Data of one CB group may be mapped to one or more CCUs, and data of different CB groups is mapped to different CCUs.

A relationship between different CCUs (to be specific, any two of the n CCUs) includes any one of the following three cases.

In a case 1, the different CCUs are overlapped in frequency domain, and are not overlapped in time domain, such as any two CCUs shown in FIG. 4, or a CCU 1 and a CCU 2 that are shown in FIG. 6.

In a case 2, the different CCUs are overlapped in time domain, and are not overlapped in frequency domain, such as any two CCUs shown in FIG. 5, or a CCU 1 and a CCU 5 that are shown in FIG. 6.

In a case 3, the different CCUs are not overlapped both in time domain and in frequency domain, such as a CCU 1 and a CCU 6 that are shown in FIG. 6.

If the relationship between any two of the n CCUs meets the case 1, in other words, any two of the n CCUs are overlapped in frequency domain and are not overlapped in time domain, because the data of the different CB groups is mapped to the different CCUs, the data of the different CB groups is overlapped in frequency domain and is not overlapped in time domain. In an example 1, assuming that one TB is divided into two CB groups: a CB group 1 and a CB group 2, data of each CB group may be mapped to two CCUs in a manner of configuring a CCU shown in FIG. 4. For example, the CB group 1 is mapped to a CCU 1 and a CCU 2, and the CB group 2 is mapped to a CCU 3 and a CCU 4.

If the relationship between any two of the n CCUs meets the case 2, in other words, any two of the n CCUs are overlapped in time domain and are not overlapped in frequency domain, because the data of the different CB groups is mapped to the different CCUs, the data of the different CB groups is overlapped in time domain and is not overlapped in frequency domain. In an example 2, assuming that one TB is divided into two CB groups: a CB group 1 and a CB group 2, data of each CB group may be mapped to one CCU in a manner of configuring a CCU shown in FIG. 5. For example, the CB group 1 is mapped to a CCU 1, and the CB group 2 is mapped to a CCU 2.

If the relationship between the different CCUs included in the n CCUs meets the case 1, the case 2, and the case 3, as shown in FIG. 6, the data of the different CB groups is overlapped in frequency domain and is not overlapped in time domain. For example, assuming that one TB is divided into two CB groups: a CB group 1 and a CB group 2, in a manner of configuring a CCU shown in FIG. 6, data of the CB group 1 may be mapped to the CCU 1, the CCU 2, the CCU 5, and the CCU 6, and data of the CB group 2 may be mapped to a CCU 3, a CCU 4, a CCU 7, and a CCU 8; or data of the CB group 1 may be mapped to the CCU 1, a CCU 3, the CCU 5, and a CCU 7, and data of the CB group 2 may be mapped to the CCU 2, a CCU 4, the CCU 6, and a CCU 8. Alternatively, the different CB groups are overlapped in time domain and are not overlapped in frequency domain. For example, assuming that one TB is divided into two CB groups: a CB group 1 and a CB group 2, in a manner of configuring a CCU shown in FIG. 6, data of the CB group 1 may be mapped to the CCU 1 to a CCU 4, and data of the CB group 2 may be mapped to the CCU 5 to a CCU 8.

Optionally, to better resist unexpected interference, before encoded and modulated data of each CB group is mapped to the first time-frequency resource, a plurality of CBs included in each CB group may be interleaved and mapped. The interleaving and mapping may be interleaving and mapping in frequency domain, to ensure that each interleaved CB and each CB before being interleaved occupy equal frequency domain bandwidth, so as to ensure a frequency domain diversity. In addition, the interleaving and mapping may alternatively be interleaving and mapping in time domain, to ensure that data in each CCU can be distributed, to the greatest extent in time domain, on all symbols of the CCU. For example, assuming that one CB group includes t CBs, data sizes of the t CBs are l1, l2, . . . , and lt, and data of the t CBs is respectively: $a_{1,1}, a_{1,2}, \ldots a_{1,l1}; a_{2,1}, \ldots a_{2,2}, \ldots a_{1,l2}; \ldots ; a_{m,1}, a_{m,2}, \ldots a_{1,lt}$. If interleaving and mapping are not performed, the transmitting end may map, in an order of frequency domain first and time domain next, the data $a_{1,1}, a_{1,2}, \ldots a_{1,l1}; a_{2,1}, a_{2,2}, \ldots a_{1,l2}; \ldots ; a_{m,1}, a_{m,2}, \ldots a_{1,lt}$ to a CCU corresponding to the CB group. If interleaving and mapping are performed, the transmitting end may first interleave the data $a_{1,1}, a_{1,2}, \ldots a_{1,l1}; a_{2,1}, a_{2,2}, \ldots a_{1,l2}; \ldots ; a_{m,1}, a_{m,2}, \ldots a_{m,l2}, \ldots a_{1,lt}$ into data $a_{1,1}, a_{2,1}, \ldots a_{t,1}; a_{1,2}, a_{2,2}, \ldots a_{t,1}; \ldots ; a_{t,lt}$, and then map, in an order of frequency domain first and time domain next, the data $a_{1,1}, a_{2,1}, \ldots a_{t,1}; a_{1,2}, a_{2,2}, \ldots a_{t,1}; \ldots ; a_{t,lt}$ to a CCU corresponding to the CB group.

S103: The transmitting end sends the data mapped to the first time-frequency resource.

Optionally, after S101, the method may further include: adding, by the transmitting end, a CRC to each CB group, so that a receiving end checks whether data of the CB group is successfully received.

Optionally, after S101, regardless of whether the transmitting end adds the CRC to each CB group, the method may further include: dividing, by the transmitting end, each CB group into one or more CBs. The method may further include: adding, by the transmitting end, a CRC to each CB, so that the receiving end checks whether data of the CB is successfully received. After the transmitting end divides each CB group into one or more CBs, regardless of whether the transmitting end adds the CRC to each CB, S102 may include: performing operations such as encoding, rate matching, scrambling, modulation, layer mapping, and antenna mapping on each CB. In this case, S103 may include: mapping, to the first time-frequency resource, data on which operations such as encoding, rate matching, scrambling, modulation, layer mapping, and antenna mapping are performed.

In the data transmission method provided in this embodiment of the present disclosure, the TB is divided into the m CB groups, the m CB groups are mapped to the n CCUs in the first time-frequency resource, and the data mapped to the first time-frequency resource is then sent. No time-frequency resources are overlapped between the different CCUs, and the data of the different CB groups is mapped to the different CCUs. In addition, the data of the different CB groups is not overlapped in time domain or is not overlapped in frequency domain. In this way, if the data of the different CB groups is not overlapped in time domain, such as the two CB groups in the example 1, when any symbol is interfered with, accuracy of data only of one CB group is affected. Compared with the prior art (such as the foregoing solution 1), a quantity of retransmitted CB groups can be reduced, so that transmission efficiency is improved. If the data of the different CB groups is not overlapped in frequency domain, such as the two CB groups in the example 2, when a narrowband in the frequency domain resource allocated in current transmission is interfered with, accuracy of data of all the CB groups is not affected. Compared with the prior art, a quantity of retransmitted CB groups can be reduced, so that transmission efficiency is improved. For example, compared with the foregoing solution 2, only the CB group 1 needs to be retransmitted. Therefore, the quantity of retransmitted CB groups is reduced, so that transmission efficiency is improved.

It should be noted that downlink control information (DCI) can be more concisely designed, the retransmitted data can be more flexibly designed (for example, only the retransmitted data, or the new data and the retransmitted data may be transmitted in one transmission process), and the like in the manner of dividing a CCU and the manner of mapping a CB group to a time-frequency resource that are provided in this embodiment of the present disclosure. For details, refer to the following.

It should be noted that the transmitting end may set a maximum value $N_{Group\_max}$ of a quantity of CB groups, considering factors such as overheads of feeding back a hybrid automatic repeat request (HARQ) indicator by the receiving end, control indication overheads, and/or a CCU quantity limit.

Optionally, S102 may include: determining, by the transmitting end, an actual value m of a quantity of CB groups based on at least one of a data size of the TB, a maximum value of a data size of a CB, a maximum value of a data size of a CB group, a maximum value of the quantity of CB groups, and the quantity n of CCUs. Some optional manners are listed below.

Manner 1: The transmitting end determines the actual value m of the quantity of CB groups based on the data size TBS of the TB, the maximum value $CB_{max}$ of the data size of the CB, the maximum value $N_{Group\_max}$ of the quantity of CB groups, and the quantity n of CCUs. $CB_{max}$ and $N_{Group\_max}$ may be preset.

Figure 8:
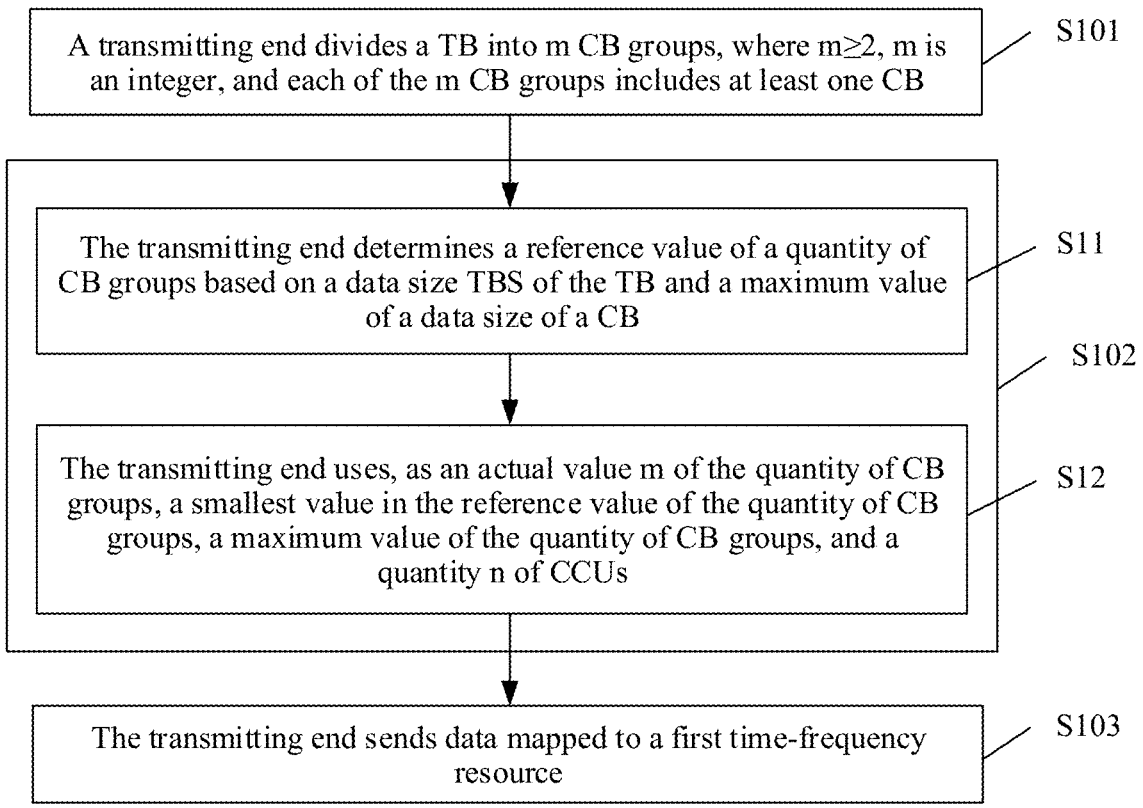
FIG. 8 is a schematic flowchart of another data transmission method according to an embodiment of the present disclosure.

Specifically, as shown in FIG. 8, the manner 1 may include the following steps S11 and S12.

S11: The transmitting end determines a reference value $N_{Group\_re}$ of the quantity of CB groups based on the data size TBS of the TB and the maximum value $CB_{max}$ of the data size of the CB.

If no CRC is added to the TB, the data size TBS of the TB is a data size of the TB. If a CRC is added to the TB, the data size TBS of the TB is a sum of a data size of the TB and a size of the CRC added to the TB.

If no CRC is added to the CB, the maximum value $CB_{max}$ of the data size of the CB is a maximum CB size (for example, $CB_{max}$ may be 6144 bits in LTE; or $CB_{max}$ may be 8192 bits in NR). If a CRC is added to the CB, the maximum value $CB_{max}$ of the data size of the CB is obtained by subtracting, from a maximum CB size, a size of the CRC added to the CB.

Specifically, the transmitting end determines, based on the data size TBS of the TB and the maximum value $CB_{max}$ of the data size of the CB, a reference value $N_{CB\_re}$ of a quantity of CBs obtained by dividing the TB. For example, the transmitting end may determine $N_{CB\_re}$ based on a formula $$N_{CB\_re} = \text{ceil}\left(\frac{TBS}{CB_{max}}\right),$$

where ceil( ) denotes rounding up; and then determine the reference value $N_{Group\_re}$ of the quantity of CB groups based on a formula $$N_{Group\_re} = \text{ceil}\left(\frac{N_{CB\_re}}{N_{CB\_min}}\right),$$

where $N_{CB\_min}$ denotes a minimum value of a quantity of CBs included in one CB group, $N_{CB\_min}$ may be preset or configured by using signaling, and performing configuration by using signaling may include dynamically/semi-statically performing configuration by using higher layer signaling or physical layer signaling. The higher layer signaling herein may be radio resource control (radio resource control, RRC) layer signaling, Medium Access Control (Medium Access Control, MAC) layer signaling, or the like. For example, if $N_{CB\_re}=1$ and $N_{CB\_min}=1$, $N_{Group\_re}=1$. If $N_{CB\_re}=8$ and $N_{CB\_min}=1$, $N_{Group\_re}=8$.

Optionally, the transmitting end may alternatively determine the reference value $N_{Group\_re}$ of the quantity of CB groups based on a formula $$N_{Group\_re} = \text{ceil}\left(\frac{N_{CB\_re}}{N_{CB\_perGroup}}\right),$$

where $N_{CB\_perGroup}$ denotes a granularity of a CB group, that is, a quantity of CBs included in a CB group, $N_{CB\_perGroup}$ may be preset or configured by using signaling, and performing configuration by using signaling may include dynamically/semi-statically performing configuration by using higher layer signaling or physical layer signaling.

Optionally, the transmitting end may alternatively determine the reference value $N_{Group\_re}$ of the quantity of CB groups based on a formula $$N_{Group\_re} = \text{ceil}\left(\frac{N_{CB\_re}}{N_{CB\_max}}\right),$$

where $N_{CB\_max}$ denotes a maximum value of the quantity of CBs included in one CB group, that is, the quantity of CBs included in the CB group. $N_{CB\_max}$ may be preset or configured by using signaling, and performing configuration by using signaling may include dynamically/semi-statically performing configuration by using higher layer signaling or physical layer signaling.

S12: The transmitting end uses, as the actual value m of the quantity of CB groups, a smallest value in the reference value $N_{Group\_re}$ of the quantity of CB groups, the maximum value $N_{Group\_max}$ of the quantity of CB groups, and the quantity n of CCUs.

Specifically, the transmitting end may determine the actual value m of the quantity of CB groups based on a formula $m = \min(N_{Group\_re}, N_{Group\_max}, n)$. For example, if $N_{Group\_re}=1$, $N_{Group\_max}=4$, and n=2, m=1. If $N_{Group\_re}=8$, $N_{Group\_max}=4$, and n=2, m=2.

It should be noted that a combination of S11 and S12 may be considered as obtaining the actual value m of the quantity of CB groups based on a formula $$m = \min\left(\frac{TBS}{CB_{Group\_min}}, N_{Group\_max}, n\right).$$

$CB_{Group\_min}$ denotes a minimum quantity of bits included in the CB group.

Manner 2: The transmitting end determines the actual value m of the quantity of CB groups based on the data size TBS of the TB, the maximum value $CB_{Group\_max}$ of the data size of the CB group, the maximum value $N_{Group\_max}$ of the quantity of CB groups, and the quantity n of CCUs. $CB_{Group\_max}$ is a maximum quantity of bits included in the CB group. $CB_{Group\_max}$ and $N_{Group\_max}$ may be preset or configured by using signaling, and performing configuration by using signaling may include dynamically/semi-statically performing configuration by using higher layer signaling or physical layer signaling.

Figure 8A:
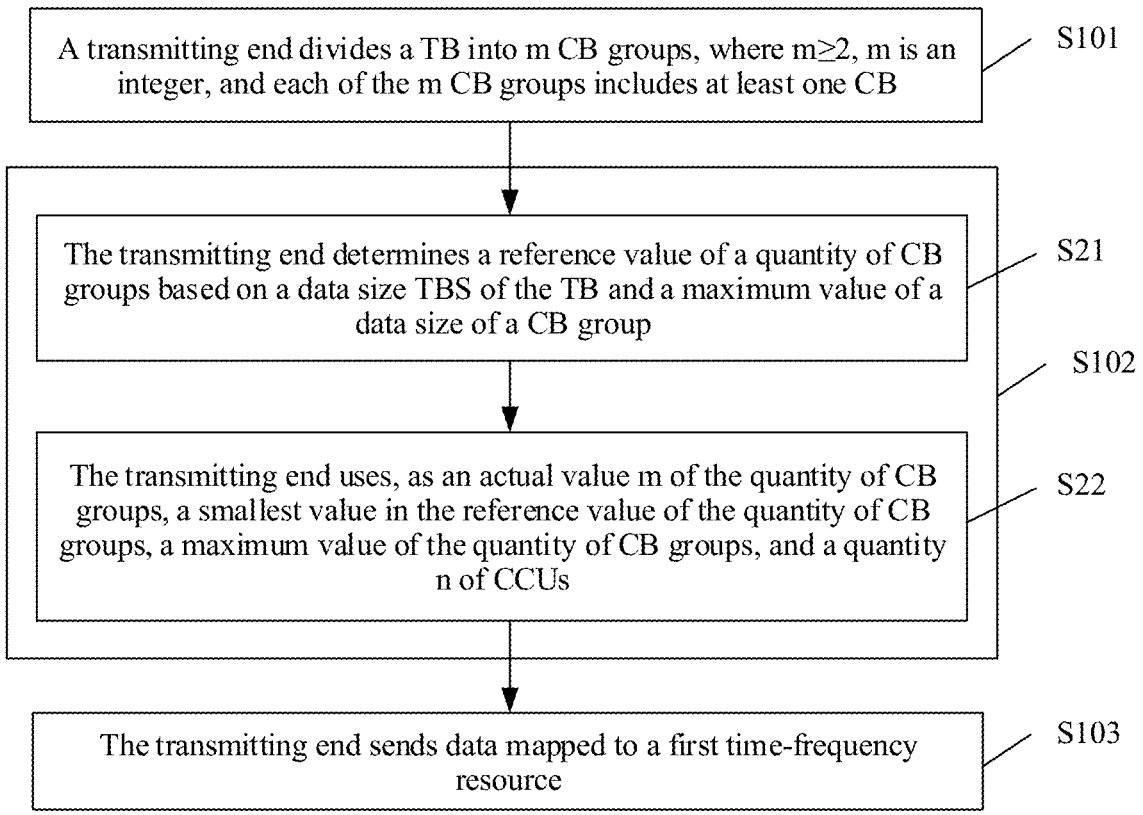
FIG. 8a is a schematic flowchart of another data transmission method according to an embodiment of the present disclosure.

Specifically, as shown in FIG. 8a, the manner 2 may include the following steps S21 and S22.

S21: The transmitting end determines a reference value $N_{Group\_re}$ of the quantity of CB groups based on the data size TBS of the TB and the maximum value $CB_{Group\_max}$ of the data size of the CB group.

If no CRC is added to the TB, the data size TBS of the TB is a data size $L_{TB}$ of the TB. If a CRC is added to the TB, the data size TBS of the TB is a sum of a data size $L_{TB}$ of the TB and a size $TB_{CRC}$ of the CRC added to the TB. To be specific, S21 may include any one of the following cases:

(1) If the TB is divided into the m CB groups, and no CRC is added to the CB group, $$N_{Group\_re} = \text{ceil}\left(\frac{L_{TB}}{CB_{Group\_max}}\right).$$

(2) If the TB is divided into the m CB groups, and a CRC is added to the CB group, $$N_{Group\_re} = \text{ceil}\left(\frac{L_{TB}}{CB_{Group\_max} - CB_{GroupCRC}}\right).$$

(3) If the TB and a CRC added to the TB are divided into the m CB groups, and no CRC is added to the CB group.

$$N_{Group\_re} = \text{ceil}\left(\frac{L_{TB} + TB_{CRC}}{CB_{Group\_max}}\right).$$

(4) If the TB and a CRC added to the TB are divided into the m CB groups, and a CRC is added to the CB group, $$N_{Group\_re} = \text{ceil}\left(\frac{L_{TB} + TB_{CRC}}{CB_{Group\_max} - CB_{GroupCRC}}\right).$$

S22: The transmitting end uses, as the actual value m of the quantity of CB groups, a smallest value in the reference value $N_{Group\_re}$ of the quantity of CB groups, the maximum value $N_{Group\_max}$ of the quantity of CB groups, and the quantity n of CCUs.

For specific implementation of step S22, refer to S12.

Manner 3: The transmitting end determines the actual value m of the quantity of CB groups based on the data size TBS of the TB. Optionally, one or more preset thresholds may be set in the transmitting end, and the transmitting end may then determine m based on the TBS and the one or more preset thresholds. For example, if TBS≤th1, the transmitting end determines that m=1; if th1<TBS≤th2, the transmitting end determines that m=2; if th2<TBS≤th3, the transmitting end determines that m=3; and so on, where th1<th2<th3.

Manner 4: The transmitting end determines the actual value m of the quantity of CB groups based on the maximum value $N_{Group\_max}$ of the quantity of CB groups. Optionally, the transmitting end uses $N_{Group\_max}$ as the actual value m of the quantity of CB groups.

Manner 5: The transmitting end determines the actual value m of the quantity of CB groups based on the quantity n of CCUs. Optionally, the transmitting end uses the quantity n of CCUs as the actual value m of the quantity of CB groups.

Manner 6: The transmitting end determines the actual value m of the quantity of CB groups based on the data size TBS of the TB and the maximum value $CB_{max}$ of the data size of the CB. Optionally, the transmitting end determines a reference value $N_{Group\_re}$ of the quantity of CB groups based on the TBS and $CB_{max}$. For a specific implementation of this step, refer to S11. $N_{Group\_re}$ is then used as the actual value m of the quantity of CB groups.

Manner 7: The transmitting end determines the actual value m of the quantity of CB groups based on the data size TBS of the TB and the maximum value $CB_{Group\_max}$ of the data size of the CB group. Optionally, the transmitting end determines a reference value $N_{Group\_re}$ of the quantity of CB groups based on the TBS and $CB_{Group\_max}$. For a specific implementation of this step, refer to S21. $N_{Group\_re}$ is then used as the actual value m of the quantity of CB groups.

Manner 8: The transmitting end determines the actual value m of the quantity of CB groups based on the data size TBS of the TB and the maximum value $N_{Group\_max}$ of the quantity of CB groups. Optionally, one or more preset thresholds may be set in the transmitting end, and the transmitting end may then determine m based on the TBS, the one or more preset thresholds, and $N_{Group\_max}$. For example, assuming that $N_{Group\_max}$=4, if TBS≤th1, the transmitting end determines that m=1; if th1<TBS≤th2, the transmitting end determines that m=2; if th2<TBS≤th3, the transmitting end determines that m=3; or if TBS>th3, the transmitting end determines that m=$N_{Group\_max}$=4, where th1<th2<th3.

Manner 9: The transmitting end determines the actual value m of the quantity of CB groups based on the data size TBS of the TB and the quantity n of CCUs. Optionally, one or more preset thresholds may be set in the transmitting end, and the transmitting end may then determine m based on the TBS, the one or more preset thresholds, and n. For example, assuming that n=4, if TBS≤th1, the transmitting end determines that m=1; if th1<TBS≤th2, the transmitting end determines that m=2; if th2<TBS≤th3, the transmitting end determines that m=3; or if TBS>th3, the transmitting end determines that m=n=4, where th1<th2<th3.

Manner 10: The transmitting end determines the actual value m of the quantity of CB groups based on the data size TBS of the TB, the maximum value $CB_{max}$ of the data size of the CB, and the maximum value $N_{Group\_max}$ of the quantity of CB groups. Optionally, the transmitting end determines a reference value $N_{Group\_re}$ of the quantity of CB groups based on the TBS and $CB_{max}$. For a specific implementation of this step, refer to S11. A smallest value in $N_{Group\_re}$ and $N_{Group\_max}$ is then used as the actual value m of the quantity of CB groups. Optionally, the transmitting end determines $N_{CB\_re}$ based on the TBS and $CB_{max}$. For related descriptions of $N_{CB\_re}$, refer to S11. The transmitting end then determines the actual value m of the quantity of CB groups based on a formula m=min($N_{CB\_re}$, $N_{Group\_max}$).

Manner 11: The transmitting end determines the actual value m of the quantity of CB groups based on the data size TBS of the TB, the maximum value $CB_{Group\_max}$ of the data size of the CB group, and the maximum value $N_{Group\_max}$ of the quantity of CB groups. Optionally, the transmitting end determines a reference value $N_{Group\_re}$ of the quantity of CB groups based on the TBS and $CB_{Group\_max}$. For a specific implementation of this step, refer to S21. A smallest value in $N_{Group\_re}$ and $N_{Group\_max}$ is then used as the actual value m of the quantity of CB groups.

This embodiment of the present disclosure provides a plurality of implementations of determining an actual value m of a quantity of CB groups included in one TB. For details, refer to the manner 1 to the manner 11 of "determining the actual value m of the quantity of CB groups" in the description of embodiments. At least the following two categories are included.

In a first category, the reference value $N_{CB\_re}$ of the quantity of CBs obtained by dividing the TB is first determined based on the formula $$N_{CB\_re} = \text{ceil}\left(\frac{TBS}{CB_{max}}\right),$$

and the actual value m of the quantity of CB groups is then determined, such as the manner 1, the manner 6, and the manner 10.

In a second category, the reference value $N_{Group\_re}$ of the quantity of CB groups obtained by dividing the TB is first determined based on the formula $$N_{Group\_re} = \text{ceil}\left(\frac{TBS}{CB_{Group\_max}}\right),$$

and the actual value m of the quantity of CB groups is then determined, such as the manner 2, the manner 7, and the manner 11.

In the manners in the first category, $N_{CB\_re}$ may not be exactly divided by m determined in the manners in the first category. Therefore, quantities of CBs in different CB groups may be different. In a possible design, the method may further include: determining a quantity C of CBs in each CB group based on a formula $$C_+ = \left\lceil \frac{N_{CB\_re}}{m} \right\rceil \text{ or } C_- = \left\lfloor \frac{N_{CB\_re}}{m} \right\rfloor,$$

where ⌈ ⌉ denotes rounding up, ⌊ ⌋ denotes rounding down, and C includes $C_+$ and $C_-$. The method may further include: determining, based on a formula $N_+ = N_{CB\_re} - mC_-$, a quantity $N_+$ of CB groups that each have $C_+$ CBs; and determining, based on a formula $N_- = m - N_+$, a quantity $N_-$ of CB groups that each have $C_-$ CBs.

In the implementation, each CB group may have the following two quantities of CBs, and the two quantities are respectively marked as $C_+$ and $C_-$, where $$C_+ = \left\lceil \frac{N_{CB\_re}}{m} \right\rceil \text{ and } C_- = \left\lfloor \frac{N_{CB\_re}}{m} \right\rfloor,$$

⌈ ⌉ denotes rounding up, and ⌊ ⌋ denotes rounding down.

It may be understood that the quantity of CB groups that each have $C_+$ CBs is marked as $N_+$, and the quantity of CB groups that each have $C_-$ CBs is marked as $N_-$. Therefore, $N_+ = N_{CB\_re} - mC_-$ and $N_- = m - N_+$.

Optionally, the CB groups that each have $C_+$ CBs may be the first $N_+$ CB groups of the m CB groups. In this case, the CB groups that each have $C_-$ CBs are the last $N_-$ CB groups of the m CB groups. Alternatively, the CB groups that each have $C_+$ CBs may be the last $N_+$ CB groups of the m CB groups. In this case, the CB groups that each have $C_-$ CBs are the first $N_-$ CB groups of the m CB groups. During specific implementation, the present disclosure is not limited thereto.

For example, assuming that $N_{CB\_re}=15$ and m=4, it may be obtained that $C_+=4$, $C_-=3$, $N_+=3$, and $N_-=1$, in other words, a quantity of CBs in each of three CB groups is 4, and a quantity of CBs in one CB group is 3. Assuming that sequence numbers of 15 CBs obtained by dividing the TB are 0 to 14, four CB groups may be {0, 1, 2, 3}, {4, 5, 6, 7}, {8, 9, 10, 11}, and {12, 13, 14}, or {0, 1, 2}, {3, 4, 5, 6}, {7, 8, 9, 10}, and {11, 12, 13, 14}.

In the manners in the second category, the TBS may not be exactly divided by m determined in the manners in the second category. Therefore, quantities of bits included in different CB groups may be different. In a possible design, the method may further include: determining a quantity B of bits in each CB group based on a formula $$B_+ = \left\lceil \frac{TBS}{m} \right\rceil$$

or $B_- = TBS - (m-1)B_+$.

In the implementation, each CB group may have the following two quantities of bits, and the two quantities are respectively marked as $B_+$ and $B_-$, where $$B_+ = \left\lceil \frac{TBS}{m} \right\rceil \text{ and } B_- = TBS - (m-1)B_+.$$

Optionally, the CB groups that each have $B_+$ bits may be the first (m−1) CB groups of the m CB groups. In this case, a CB group having $B_-$ bits is the last one of the m CB groups. Alternatively, the CB groups that each have $B_+$ bits may be the last (m−1) CB groups of the m CB groups. In this case, a CB group having $B_-$ bits is the first one of the m CB groups.

It may be understood that, if no CRC is added to the CB group, $B_+$ and $B_-$ are data sizes of the CB group. If a CRC is added to the CB group, each of $B_+$ and $B_-$ is a sum of a data size of the CB group and a size of the CRC added to the CB group.

Figure 9:
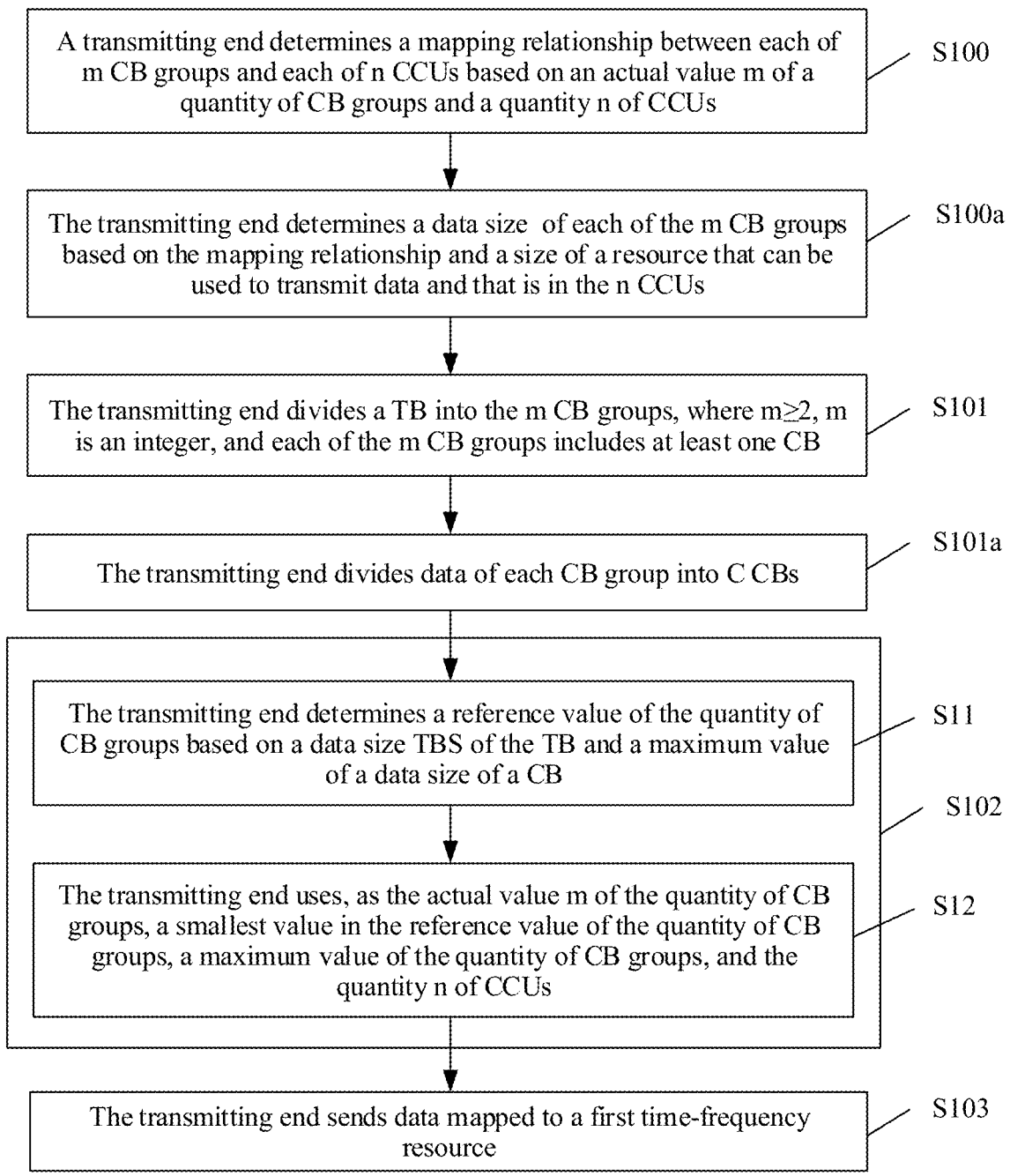
FIG. 9 is a schematic flowchart of another data transmission method according to an embodiment of the present disclosure.

Optionally, as shown in FIG. 9, before S101, the method may further include the following steps S100 and S100a.

S100: The transmitting end determines a mapping relationship between each of the m CB groups and each of the n CCUs based on the actual value m of the quantity of CB groups and the quantity n of CCUs.

For example, a mapping relationship between an $i^{th}$ CB group and the quantity of CCUs may be determined based on the following formula 1:

$$n_i = \begin{cases} \max\left(\text{floor}\left(\frac{n}{m}\right), 1\right) & i = 1, 2 \ldots, m-1 \\ n - \sum_{i=1}^{m-1} n_i & i = m \end{cases} \quad \text{Formula 1}$$

where $n_i$ denotes a quantity of CCUs to which the $i^{th}$ CB group is mapped, and floor( ) denotes rounding down.

The formula 1 shows a correspondence between the $i^{th}$ CB group and the quantity of CCUs, but does not provide a mapping relationship between each CB group and one or more specific CCUs. The mapping relationship between each CB group and one or more specific CCUs is not limited in this embodiment of the present disclosure. Optionally, the mapping relationship between each CB group and a CCU may be successively set in an order of the n CCUs. For example, a mapping relationship exists between a first CB group and a first CCU to an $n_1^{th}$ CCU, a mapping relationship exists between a second CB group and an $(n_1+1)^{th}$ CCU to an $(n_1+n_2)^{th}$ CCU, and by analogy, a mapping relationship exists between an $m^{th}$ CB group and an $(n_1+n_2+\ldots n_{m-1}+1)^{th}$ CCU to an $(n_1+n_2+\ldots n_{m-1}+n_m)^{th}$ CCU. For example, in FIG. 4, n=4. In this case, if m=1, a mapping relationship exists between the CB group and the four CCUs; if m=2, a mapping relationship exists between the first CB group and a CCU 1 and a CCU 2, and a mapping relationship exists between the second CB group and a CCU 3 and a CCU 4; if m=4, a mapping relationship exists between each CB group and one CCU in an order of the CCUs.

It should be noted that a CB group is mapped to a corresponding CCU according to a rule in this embodiment of the present disclosure. In this way, if interference occurs in a data transmission process, provided that a time domain resource and a frequency domain resource that are occupied by the interference are determined, data of specific CB groups that is interfered with may be determined. Therefore, compared with the prior art, interference cancellation (IC) can be more desirably performed.

S100a: The transmitting end determines a data size of each of the m CB groups based on the mapping relationship and a size of a resource that can be used to transmit data and that is in the n CCUs.

The resource that can be used to transmit data is a remaining resource other than a resource used to transmit non-data information such as control information, a GP, and reference information.

Specifically, the transmitting end may determine a data size of an $i^{th}$ CB group of the m CB groups based on the following formula 2:

$$B_i = \begin{cases} \text{floor}\left((L_{TB} + L_{TB\_CRC}) * \dfrac{S_{CB\_i}}{S_{total}}\right) & i = 1, 2, \ldots, m-1 \\ L_{TB} + L_{TB\_CRC} - \sum_{i=1}^{m-1} B_i & i = m \end{cases} \quad \text{Formula 2}$$

where $B_i$ denotes the data size of the $i^{th}$ CB group of the m CB groups, $1 \leq i \leq m$, and i is an integer; $L_{TB}$ denotes the data size of the TB, $L_{TB\_CRC}$ denotes the size of the CRC added to the TB, $L_{TB\_CRC} \geq 0$, $S_{CB\_i}$ denotes a size of a resource that can be used to transmit data and that is in a CCU corresponding to the $i^{th}$ CB group, $S_{total}$ denotes the size of the resource that can be used to transmit data and that is in the n CCUs, and floor( ) denotes rounding down.

It should be noted that $L_{TB\_CRC} \geq 0$ in the formula 2 indicates that the transmitting end may divide the TB into the m CB groups, or may divide the TB into the m CB groups after the CRC is added to the TB.

For example, $$\dfrac{S_i}{S_{total}}$$

in the formula 2 may be specifically $$\dfrac{RE_i}{RE_{total}} \text{ or } \dfrac{Sym_i}{Sym_{total}}.$$

$RE_i$ denotes a quantity of REs that can be used to transmit data and that are in the CCU corresponding to the $i^{th}$ CB group, and total denotes a quantity of REs that can be used to transmit data and that are in the n CCUs. $Sym_i$ denotes a quantity of symbols that can be used to transmit data and that are in the CCU corresponding to the $i^{th}$ CB group, and $Sym_{total}$ denotes a quantity of symbols that can be used to transmit data and that are in the n CCUs.

It should be noted that determining the data size of each CB group based on the specific examples in S100 and S100a can ensure, to the greatest extent, that the data of the m CB groups can be as uniformly as possible distributed on the n CCUs, so that a bit rate, which is obtained after encoding and rate matching are performed, of each CB group is basically consistent, and adaptive modulation and coding (adaptive modulation and coding, AMC) is normally performed.

Optionally, as shown in FIG. 9, after S101, the method may further include the following step S101a:

S101a: The transmitting end divides data of each CB group into C CBs.

Specifically, when a CRC is added to each CB, C=ceil(B/($CB_{max}$−$CB_{CRC}$); when no CRC is added to each CB, C=ceil(B/$CB_{max}$); ceil( ) denotes rounding up, B denotes the data size of the CB group, $CB_{max}$ denotes the maximum value of the data size of the CB, and $CB_{CRC}$ denotes a size of the CRC added to the CB.

If no CRC is added to the CB group, the data size B of the CB group is a data size $L_{CBgroup}$ of the CBgroup. If a CRC is added to the CB group, the data size B of the CB group is a sum of a data size $L_{CBgroup}$ of the CBgroup and a size $CB_{GroupCRC}$ of the CRC added to the CB group. That is, the optional implementation may include any one of the following:

(1) If the CB group is divided into the C CBs, and no CRC is added to the CB, $$C = \text{ceil}\left(\dfrac{L_{CBgroup}}{CB_{max}}\right).$$

(2) If the CB group is divided into the C CBs, and the CRC is added to the CB, $$C = \text{ceil}\left(\dfrac{L_{CBgroup}}{CB_{max} - CB_{CRC}}\right).$$

(3) If the CB group and the CRC added to the CB group are divided into the C CBs, and no CRC is added to the CB, $$C = \text{ceil}\left(\dfrac{L_{CBgroup} + CB_{GroupCRC}}{CB_{max}}\right).$$

(4) If the CB group and the CRC added to the CB group are divided into the C CBs, and the CRC is added to the CB group, $$C = \text{ceil}\left(\dfrac{L_{CBgroup} + CB_{GroupCRC}}{CB_{max} - CB_{CRC}}\right).$$

It should be noted that, during specific implementation, the method for dividing a TB into m CB groups, the method for dividing a CB group into C CBs, a mapping relationship between the m CB groups and the n CCUs, and the like that are shown above may all be agreed by the transmitting end and the receiving end in advance. In other words, the transmitting end does not need to indicate the information to the receiving end. In addition, information such as a specific TB and/or a specific CB group to which the data transmitted on the first time-frequency resource belongs may be agreed by the transmitting end and the receiving end in advance. To enhance communication robustness, the information may alternatively be indicated by the transmitting end to the receiving end.

The method used by the transmitting end to send data to the receiving end is described above. During specific implementation, in addition to sending, to the receiving end, the data processed according to the foregoing steps, the transmitting end further needs to send DCI to the receiving end. The DCI is used to indicate to the receiving end how to process the received data. This embodiment of the present disclosure provides a method for designing DCI. Specifically, the DCI may include the following information:

(1) A modulation and coding scheme (MCS) indication, used to indicate an MCS used by currently transmitted data. During specific implementation, the DCI may include one MCS, indicating an MCS used by the data carried on the first time-frequency resource. Optionally, to enhance flexibility and robustness of communication, a plurality of MCS indications may alternatively be used to indicate the MCS used by currently transmitted data. Each MCS indication is used to indicate an MCS used by data mapped to one CCU, or to indicate an MCS used by data of one CB group.

It should be noted that a modulation scheme and a coding scheme are collectively referred to as an MCS in (1), and one MCS indication is used to indicate one modulation scheme and one coding scheme. During specific implementation, the modulation scheme and the coding scheme may alternatively be independently indicated. For example, 1 or N modulation scheme indications are used to indicate the modulation scheme used by the currently transmitted data, and/or 1 or N coding scheme indications are used to indicate the coding scheme used by the currently transmitted data.

(2) A transmission redundancy information indication, used to indicate transmission redundancy information used by the currently transmitted data. The transmission redundancy information indication is related to a coding algorithm used when the transmitting end performs encoding. The coding algorithm may include, but is not limited to, a turbo coding algorithm, a low-density parity-check (LDPC) coding algorithm, and the like. For example, when the coding algorithm is the turbo coding algorithm, the transmission redundancy information indication may be specifically a redundancy version (RV). When the coding algorithm is the LDPC coding algorithm, the transmission redundancy information indication may be specifically related information indicating combination of LDPC coding retransmission incremental redundancy (IR). An example in which the transmission redundancy information indication is the RV is used below for description.

During specific implementation, one RV may be used to indicate an RV used by the data carried on the first time-frequency resource. Optionally, to enhance flexibility and robustness of communication, a plurality of RVs may alternatively be used to indicate the RV used by the currently transmitted data. Each RV is used to indicate an RV used by data mapped to one CCU, or to indicate an RV used by data of one CB group.

(3) A new data indicator (NDI), used to indicate whether the data mapped to the first time-frequency resource is new data or retransmitted data. 1 or N NDIs may be set in this embodiment of the present disclosure. N NDIs are N bits, and N may be a quantity of CCUs included in the first time-frequency resource, or may be the maximum value of the quantity of CB groups or the actual value m of the quantity of CB groups. If N is the quantity of CCUs included in the first time-frequency resource, each bit indicates whether data mapped to a corresponding CCU is new data or retransmitted data. If N is the maximum value of the quantity of CB groups or the actual value m of the quantity of CB groups, each bit indicates whether data of a corresponding CB group is new data or retransmitted data.

It should be noted that, if only the retransmitted data is transmitted in the current transmission process, information that represents the new data and that is in the NDI is meaningless, and for example, may be used to indicate that a corresponding CB group is not retransmitted on a currently scheduled resource. It may be understood that information used to indicate the meaning is not limited to the NDI, provided that a function of the information indicating the meaning is the same as a function of the NDI. If the new data and the retransmitted data are transmitted in the current transmission process, information that represents the new data and the retransmitted data and that is in the NDI is meaningful.

Optionally, the DCI may further include information used to indicate a specific TB and/or a specific CB group to which the data transmitted on the first time-frequency resource belongs. In this way, communication robustness can be enhanced.

In addition, it should be noted that an example in which data of one TB is transmitted in the current transmission process is used above for description. During actual implementation, data of a plurality of TBs may alternatively be transmitted in one transmission process. The data of the plurality of TBs is multiplexed on a same time-frequency resource. In this embodiment of the present disclosure, a plurality of TBs (for example, two TBs) or a plurality of CB groups (or two CB groups) may be multiplexed in a frequency division multiplexing (FDM) manner or in a time division multiplexing (DMT) manner, that is, mapped to different CCUs in frequency domain or mapped to different CCUs in time domain. Therefore, optionally, a resource mapping manner indication may be added to the DCI, and is used to indicate whether a multiplexing and mapping manner of two codewords is spatial multiplexing, frequency division multiplexing, time division multiplexing, or the like. Optionally, a subsequent ACK/NACK feedback is compatible with LTE, or reuses an LTE design (for example, two TBs or two CB groups are independently fed back, are independently scheduled, and separately correspond to one NDI, RV, MCS, or the like).

Optionally, when the technical solution provided in this embodiment of the present disclosure is applied to a multiple-input multiple-output (MIMO) system, when spatial multiplexing is performed on a plurality of TBs transmitted in one transmission process, the transmitting end may perform an independent operation on each of the plurality of TBs. In other words, data transmission is performed on each of the plurality of TBs according to the technical solution provided in this application. Alternatively, the transmitting end may perform a joint operation on the plurality of TBs, for example, may determine a uniform division manner based on a TB of the plurality of TBs that has a largest or smallest data size. For example, a TBS used in a process of determining the actual value m of the quantity of CB groups may be determined based on the TB of the plurality of TBs that has the largest or smallest data size.

Figure 10:
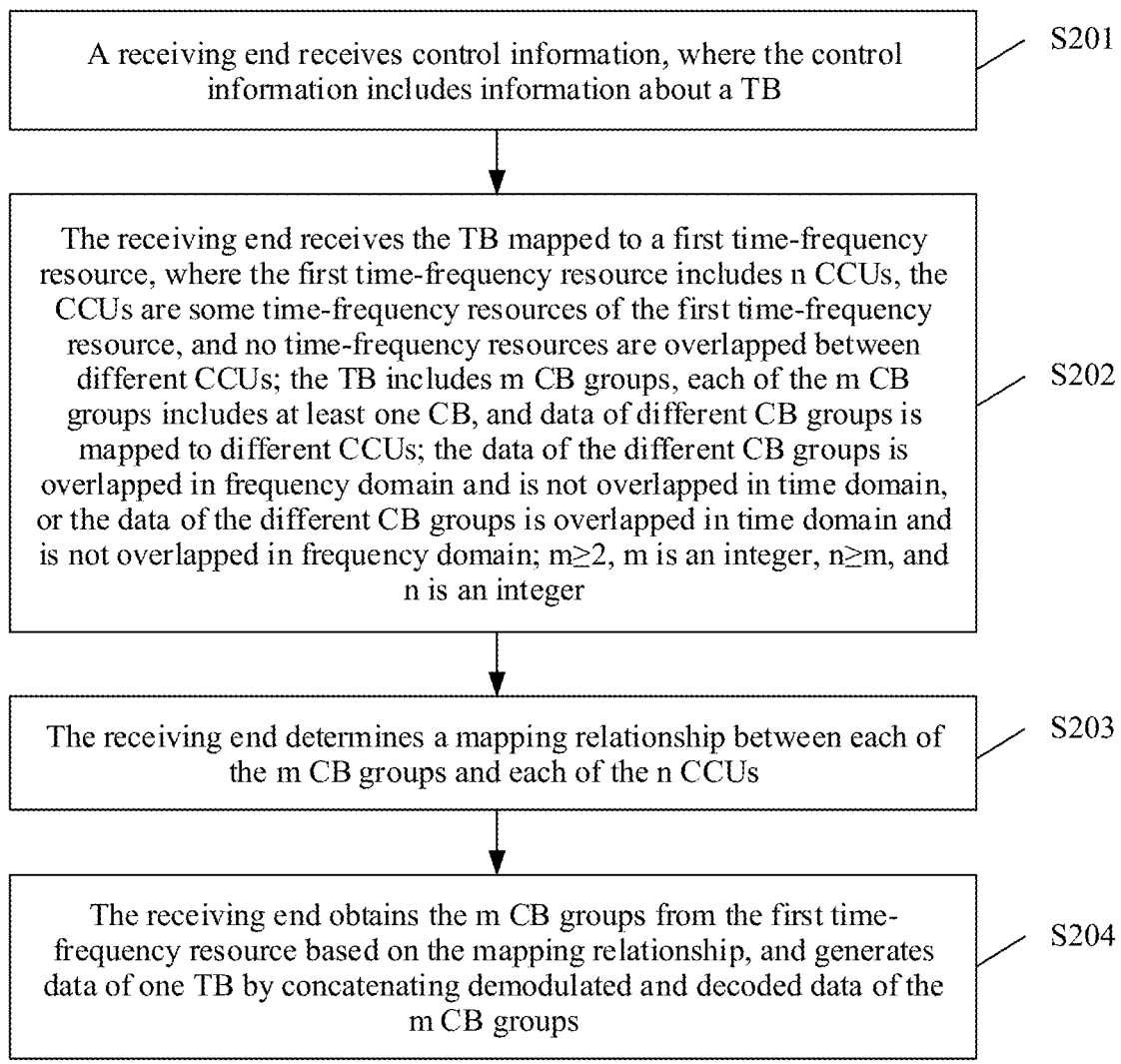
FIG. 10 is a schematic flowchart of another data transmission method according to an embodiment of the present disclosure.

FIG. 10 is a schematic flowchart of another data transmission method according to an embodiment of the present disclosure. For explanations of related content of the optional implementation, refer to the foregoing. The method may include the following steps S201 to S204.

S201: A receiving end receives control information, where the control information includes information about a TB.

The control information may be DCI. For a manner of designing the DCI, refer to the foregoing. The information about the TB includes a data size of the TB. Optionally, the information about the TB may further include at least one of the following information: an actual value m of a quantity of CB groups obtained by dividing the TB, a quantity of CCUs to which the TB is mapped, a division rule of dividing the TB into m CB groups, a division rule of dividing a CB group into CBs, an identifier of at least one CB group, an identifier of a CCU to which the at least one CB group is mapped, a manner of configuring a CCU, and the like.

S202: The receiving end receives the TB mapped to a first time-frequency resource. The first time-frequency resource includes n CCUs, the CCUs are some time-frequency resources of the first time-frequency resource, and no time-frequency resources are overlapped between different CCUs; the TB includes m CB groups, each of the m CB groups includes at least one CB, and data of different CB groups is mapped to different CCUs; the data of the different CB groups is overlapped in frequency domain and is not overlapped in time domain, or the data of the different CB groups is overlapped in time domain and is not overlapped in frequency domain; m≥2, m is an integer, n≥m, and n is an integer.

Optionally, the information about the TB includes the data size of the TB. After S201, the method may further include: determining, by the receiving end, an actual value m of a quantity of CB groups based on the data size of the TB, a maximum value of a data size of a CB, a maximum value of the quantity of CB groups, and a quantity n of CCUs.

S203: The receiving end determines a mapping relationship between each of the m CB groups and each of the n CCUs.

S203 may specifically include: determining, by the receiving end, the mapping relationship between each of the m CB groups and each of the n CCUs based on the actual value m of the quantity of CB groups and the quantity n of CCUs. For related explanations of the implementation, refer to the foregoing.

S204: The receiving end obtains the m CB groups from the first time-frequency resource based on the mapping relationship, and generates data of one TB by concatenating demodulated and decoded data of the m CB groups.

Optionally, after S203, before S204, the method may further include: determining, by the receiving end, a data size of each of the m CB groups based on the mapping relationship and a size of a resource that can be used to transmit data and that is in the n CCUs. For related explanations of the optional implementation, refer to the foregoing. Details are not described herein again.

Optionally, after S204, the method may further include: dividing, by the receiving end, data of each CB group into C CBs. For a specific implementation, refer to the foregoing. Details are not described herein again.

For advantageous effects of the technical solution provided in this embodiment, refer to the foregoing. Details are not described herein again.

"The receiving end obtains the m CB groups from the first time-frequency resource based on the mapping relationship" in S204 may be considered as an inverse resource mapping process. That the receiving end generates data of one TB by concatenating demodulated and decoded data of the m CB groups, to may include: performing, by the receiving end, an inverse operation and decoding based on descrambling, demodulation, and rate matching that are included in the DCI, and then generating the data of one TB by concatenating on decoded data.

Optionally, the method may further include: performing, by the receiving end, an operation such as a CRC after decoding the data of the m CB groups. Optionally, the method may further include the following steps S1 and S2.

S1: The receiving end feeds back a multiple-bit ACK/NACK to a transmitting end based on the quantity of CB groups mapped to the first time-frequency resource. A quantity of bits may be a fixed value that is set in a system. The fixed value may be a value greater than or equal to the maximum value of the quantity of CB groups, or may be correspondingly and dynamically adjusted to the actual value m of the quantity of CB groups based on information such as a TBS or an MCS. Each bit is used to indicate whether data of a corresponding CB group is correctly checked.

For example, if a CRC is added to each CB, and a CRC is added to each CB group, when CRCs of all CBs in one CB group are correct, and a CRC of the CB group is correct, the receiving end feeds back an ACK on a bit corresponding to the CB group; or when a CRC of at least one CB in one CB group is incorrect, or a CRC of the CB group is incorrect, the receiving end feeds back a NACK. If a CRC is added to each CB, and no CRC is added to the CB group, when CRCs of all CBs in one CB group are correct, the receiving end feeds back an ACK on a bit corresponding to the CB group; or when a CRC of at least one CB in one CB group is incorrect, the receiving end feeds back a NACK.

S2: The transmitting end receives an ACK/NACK feedback sent by the receiving end.

It should be noted that only a CRC performed by the receiving end on the CB group is described below. During specific implementation, the method may further include: performing, by the receiving end, a CRC on each CB and/or a CRC on the TB. For a specific implementation process thereof, refer to the prior art. Details are not described herein again.

During specific implementation, if the ACK/NACK feedback received by the transmitting end includes only ACKs, data of a next TB continues to be transmitted to the receiving end according to the data transmission method provided above. If the ACK/NACK feedback received by the transmitting end includes a NACK, data of a CB group corresponding to the NACK may be retransmitted to the receiving end according to a retransmission processing process provided below.

The process in which the transmitting end retransmits data and that is provided in this embodiment of the present disclosure is described below, and may specifically include the following two cases.

In a first case, only the retransmitted data is transmitted in one transmission process.

Figure 11:
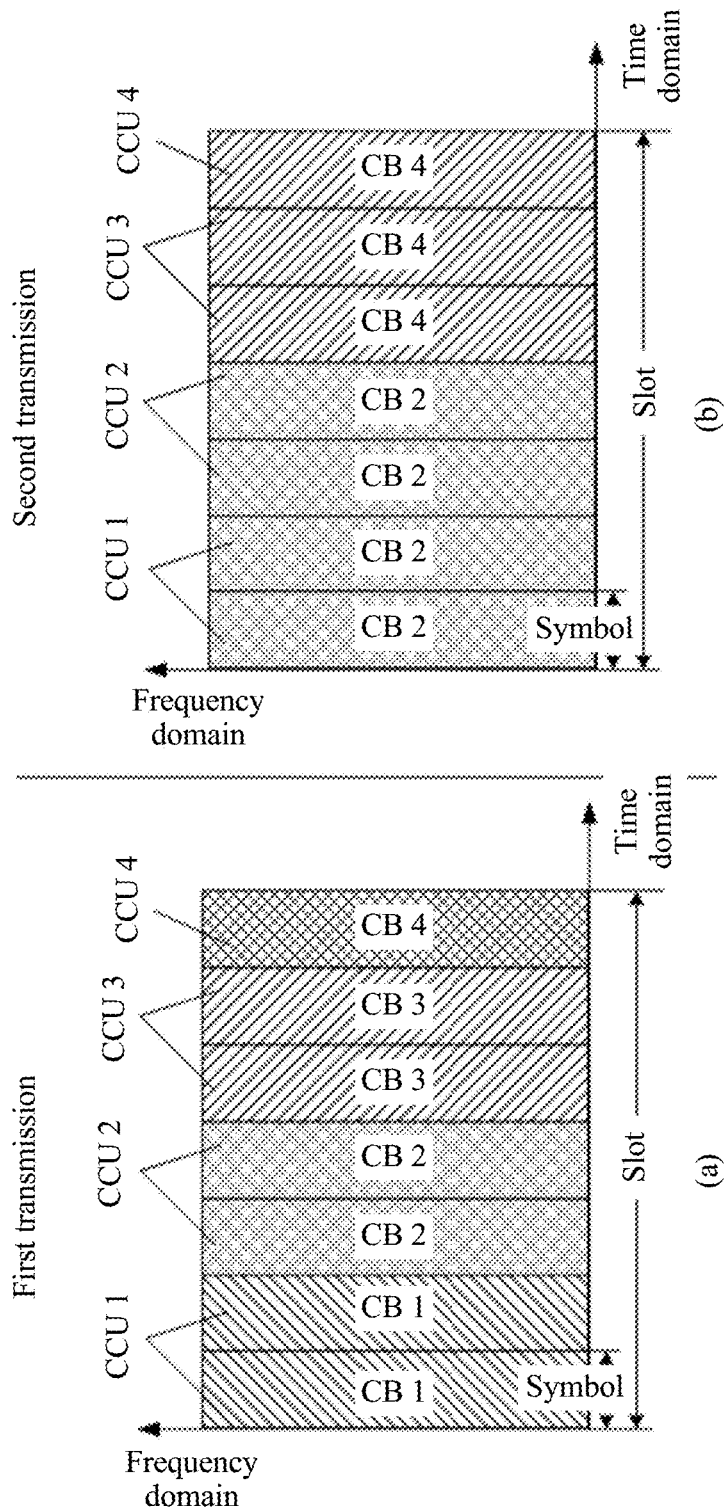
FIG. 11 is a schematic diagram of a transmission process according to an embodiment of the present disclosure.

FIG. 11 is a schematic diagram of a transmission process. A time-frequency resource shown in (a) in FIG. 11 indicates a time-frequency resource allocated in a first transmission process, the time-frequency resource is one slot in time domain, and the slot includes seven symbols. The time-frequency resource is divided into a CCU 1 to a CCU 4. Data transmitted in the first transmission process is new data TB, and the TB is divided into a CB group 1 to a CB group 4. Each CB group is successively mapped to one CCU in a CCU group order. Assuming that an ACK/NACK fed back by the receiving end to the transmitting end in the first transmission process indicates that data in a CB 2 and data in a CB 4 need to be retransmitted, the data in the CB 2 and the data in the CB 4 may be successively and respectively mapped to two CCUs in the CCU group order in a second transmission process. In other words, the data in the CB 2 is mapped to the CCU 1 and the CCU 2, and the data in the CB 4 is mapped to the CCU 3 and the CCU 4, as shown in (b) in FIG. 11.

It should be noted that a CCU configuration rule in the retransmission process, a mapping relationship between a retransmitted CB group and a CCU, and the like may all be agreed by the transmitting end and the receiving end in advance, and therefore, do not need to be indicated by the transmitting end to the receiving end. To enhance flexibility and robustness of communication, the mapping relationship between each retransmitted CB group and a CCU may alternatively be indicated in the DCI in the retransmission process.

Optionally, a retransmission resource may also be allocated as required. In the foregoing example, if the ACK/

NACK fed back by the receiving end to the transmitting end indicates that the data in the CB 2 and the data in the CB 4 need to be retransmitted, the transmitting end allocates only the CCU 2 and the CCU 4 in the second transmission process. The CCU 2 is configured to retransmit the data in the CB 2, and the CCU 4 is configured to retransmit the data in the CB 4. In the implementation, a resource occupied by the retransmitted data may be the same as a resource occupied during initial transmission. For example, a quantity of and/or locations of CCUs occupied by the retransmitted data is/are the same as a quantity of and/or locations of CCUs occupied during initial transmission. In this way, control signaling indication overheads can be reduced.

In addition, It should be noted that an indication of a quantity of retransmitted CB groups may be added to the DCI, to enable this solution to be compatible with a rateless transmission mode. During specific implementation, assuming that an NDI in one retransmission process indicates that data of two initially transmitted CB groups needs to be retransmitted, but the indication, which is in the DCI, of the quantity of retransmitted CB groups is one, the two CB groups indicated in the NDI are implicitly combined into one CB group. In addition, during retransmission, an RB may be adaptively reduced.

In a second case, the retransmitted data and the new data are transmitted in one transmission process.

Optionally, a location of a time-frequency resource to which the retransmitted data is mapped in the current transmission process is the same as a location of a time-frequency resource to which the new data corresponding to the retransmitted data is mapped. In this way, the transmitting end does not need to indicate, to the receiving end, the location of the time-frequency resource occupied by the retransmitted data. Certainly, during specific implementation, the location of the time-frequency resource to which the retransmitted data is mapped in the current transmission process may alternatively be different from the location of the time-frequency resource to which the new data corresponding to the retransmitted data is mapped. In this case, the transmitting end needs to indicate, to the receiving end, the location of the time-frequency resource occupied by the retransmitted data.

Figure 12:
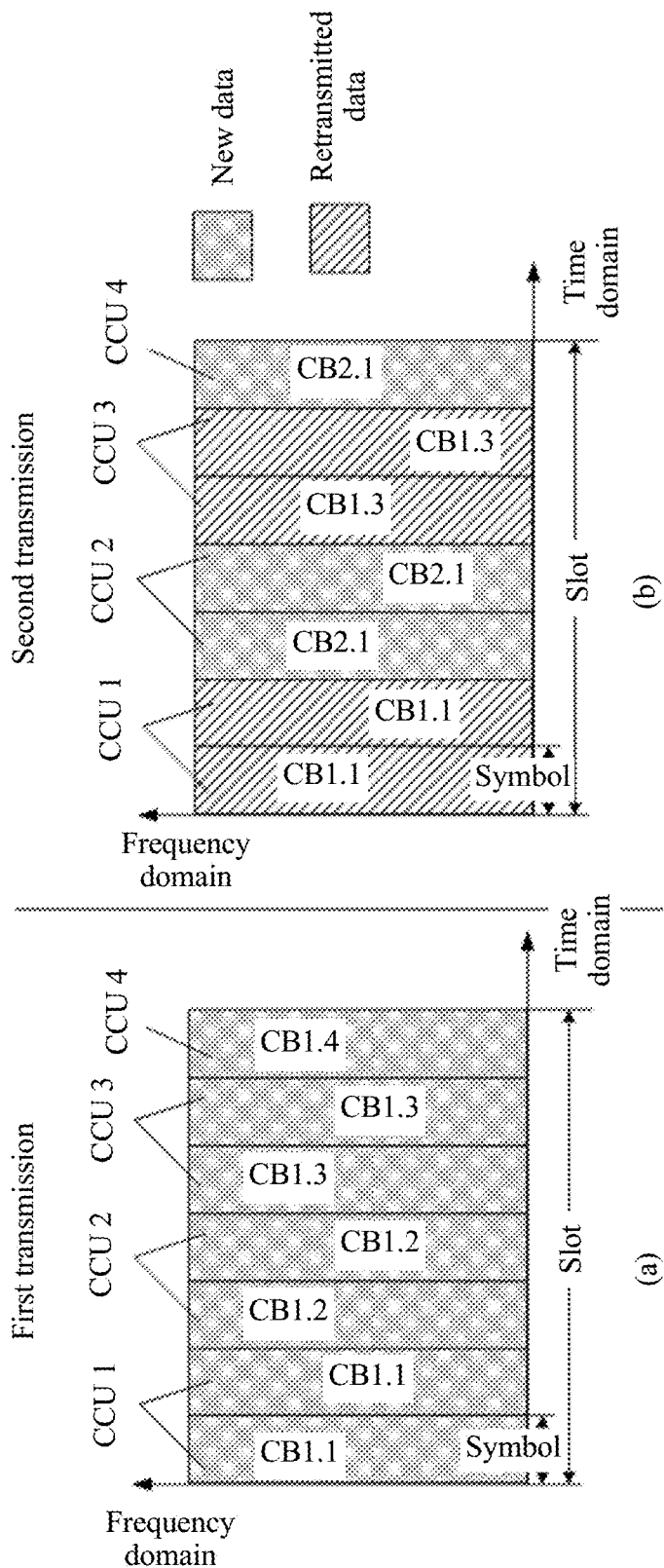
FIG. 12 is a schematic diagram of another transmission process according to an embodiment of the present disclosure.

FIG. 12 is a schematic diagram of a transmission process. It is assumed that a time-frequency resource allocated in each transmission process is one slot in time domain, and the slot includes seven symbols. Moreover, the time-frequency resource allocated in each transmission process is divided into four CCUs: a CCU 1 to a CCU 4. Each of the first three CCUs includes two symbols, and the last CCU includes one symbol. Therefore, In a first transmission process, to transmit new data TB 1, a transmitting end may determine a size of the TB 1 based on sizes of the CCU 1 to the CCU 4, and then divide the TB 1 into four CB groups based on the size of the TB 1 and according to the method provided above. The four CB groups are marked as a CB group 1.1 to a CB group 1.4. Next, the transmitting end successively maps each CB group to one CCU in a CCU group order, as shown in (a) in FIG. 12. If an ACK/NACK fed back by a receiving end to the transmitting end in the first transmission process indicates that data in a CB 1 and data in a CB 3 need to be retransmitted, then:

In a second transmission process, to transmit retransmitted data and new data TB 2, the transmitting end may determine a size of the new data TB 2 based on available CCUs (that is, the CCU 2 and the CCU 4), and then divide the TB 2 into one CB group based on the size of the TB 2 and according to the method provided above. The one CB group is marked as a CB group 2.1. Next, the transmitting end maps the CB group to the CCU 2 and the CCU 4, as shown in (b) in FIG. 12. The ACK/NACK fed back by the receiving end to the transmitting end in the first transmission process indicates that the data in the CB 1 and the data in the CB 3 need to be retransmitted.

The following points of a process of retransmitting data by the transmitting end need to be described.

First, in the foregoing embodiment, when data of a plurality of CB groups needs to be retransmitted, the transmitting end retransmits the data of the plurality of CB groups in one transmission process. During actual implementation, the data of the plurality of CB groups may alternatively be retransmitted in a plurality of transmission processes. In this case, optionally, information about a currently retransmitted CB group may be indicated in the DCI in each transmission process. The information about the currently retransmitted CB group may include at least one of the following information: an identifier of the CB group and an identifier of a TB to which the CB group belongs.

Second, in the foregoing embodiment, when the transmitting end determines that a CB group needs to be retransmitted, data of the entire CB group is retransmitted. During actual implementation, in a data transmission process, assuming that some data of one CB group is interfered with, the transmitting end may select, from a CB group needing to be retransmitted, based on a feature of the interference (such as the interference shown in the dashed-line box 1 shown in FIG. 2 or the interference shown in the dashed-line box 2 shown in FIG. 2) for retransmission, data mapped to one or more symbols/mini-slots/slots that are interfered with, or data mapped to one or more RBs that are interfered with, data mapped to one or more CCUs that are interfered with, or the like. Pertinent retransmission is considered in the implementation. Compared with retransmitting the data of the CB group, a scheduling granularity in the retransmission process is smaller. Therefore, transmission efficiency can be further improved. Optionally, to ensure communication robustness, a resource allocation indication of the retransmitted data, information about the retransmitted data (for example, specific symbols/min-slots/slots/RBs/CCUs on which data corresponding to the retransmitted data is located in an initial transmission process), and the like may be added to the DCI.

Figure 12A:
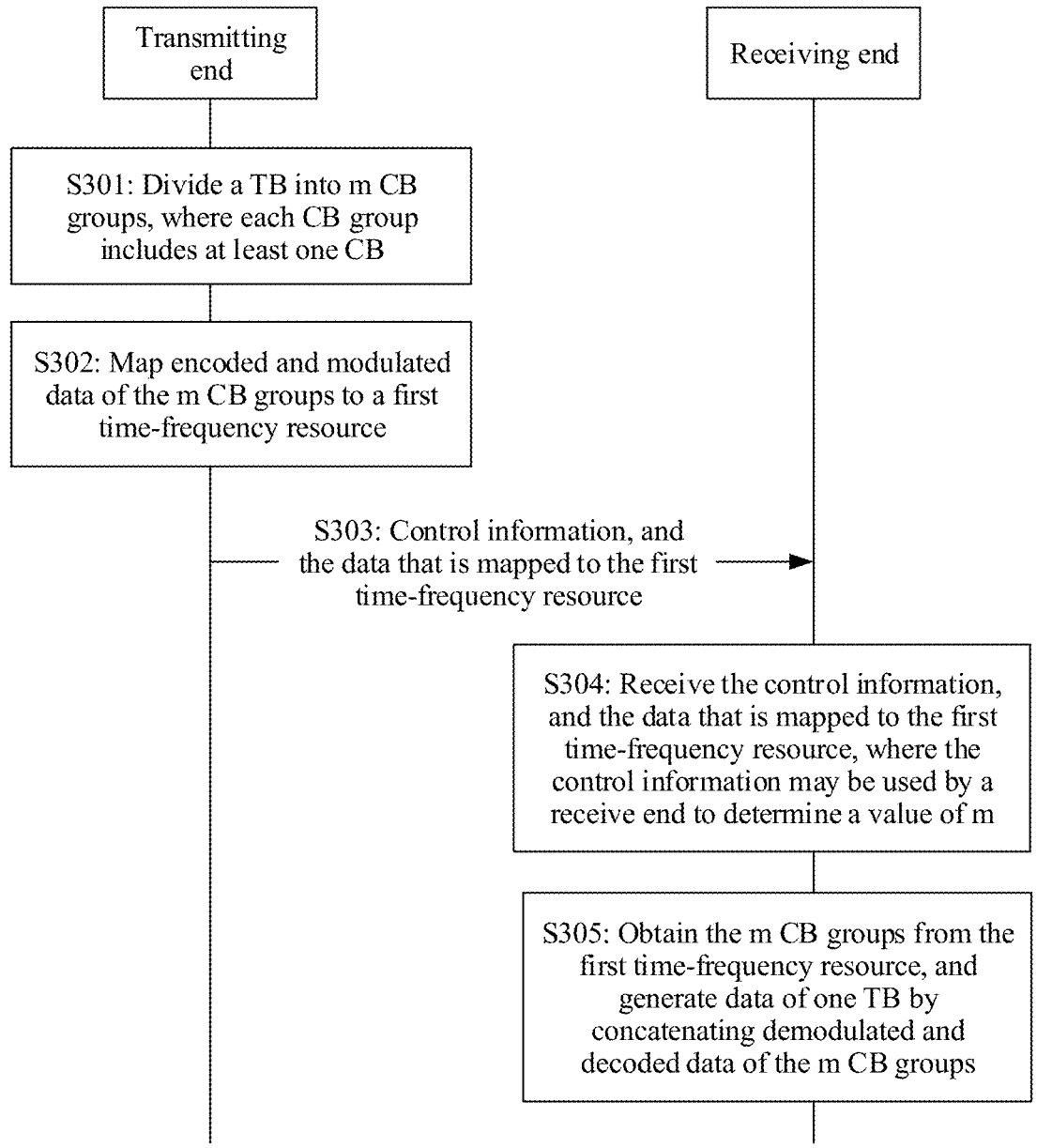
FIG. 12a is a schematic interaction diagram of a data transmission method according to an embodiment of the present disclosure.

FIG. 12a is a schematic interaction diagram of a data transmission method according to an embodiment of the present disclosure. The method shown in FIG. 12a includes the following steps S301 to S305:

S301: A transmitting end divides a TB into m CB groups, where each CB group includes at least one CB.

S302: The transmitting end maps encoded and modulated data of the m CB groups to a first time-frequency resource.

S303: The transmitting end sends control information, and the data that is mapped to the first time-frequency resource, where the control information includes information about the TB.

S304: A receiving end receives the control information and the data that is mapped to the first time-frequency resource, where the control information may be used by the receiving end to determine a value of m.

S305: The receiving end obtains the m CB groups from the first time-frequency resource, and generates data of one TB by concatenating demodulated and decoded data of the m CB groups.

For a method for determining m by the transmitting end and the receiving end, a method for dividing a CB group into CBs, a method for transmitting a plurality of TBs, and the like, refer to the foregoing. Details are not described herein again.

In the technical solution, one TB is divided into a plurality of CB groups, and each CB group includes at least one CB. In this way, if the receiving end determines that data of one CB group or data of one or more CBs in one CB group is unsuccessfully transmitted, the transmitting end needs to retransmit the data only of the CB group. Therefore, resources can be saved, and transmission efficiency is improved.

The solutions provided in the embodiments of the present disclosure are mainly described above from a perspective of interaction between network elements. It may be understood that, to implement the foregoing functions, network elements such as the transmitting end and the receiving end include corresponding hardware structures and/or corresponding software modules executing various functions. Persons skilled in the art should be easily aware that, with reference to the examples described in the embodiments disclosed in this specification, modules and algorithm steps may be implemented in a form of hardware or in a form of a combination of hardware and computer software in the present disclosure. Whether a function is executed by hardware or computer software driving hardware depends on particular applications and design constraint conditions of the technical solutions. Persons skilled in the art may use different methods to implement the described functions for each particular application, but it should not be considered that the implementation goes beyond the scope of the present disclosure.

Function modules of the transmitting end and the receiving end may be divided according to the method examples in the embodiments of the present disclosure. For example, function modules corresponding to various functions may be divided, or two or more functions may be integrated into one processing module. The foregoing integrated module may be implemented in a form of hardware, or may be implemented in a form of a software function module. It should be noted that the module division in the embodiments of the present disclosure is an example, and is merely logical function division and may be other division in actual implementation.

Figure 13:
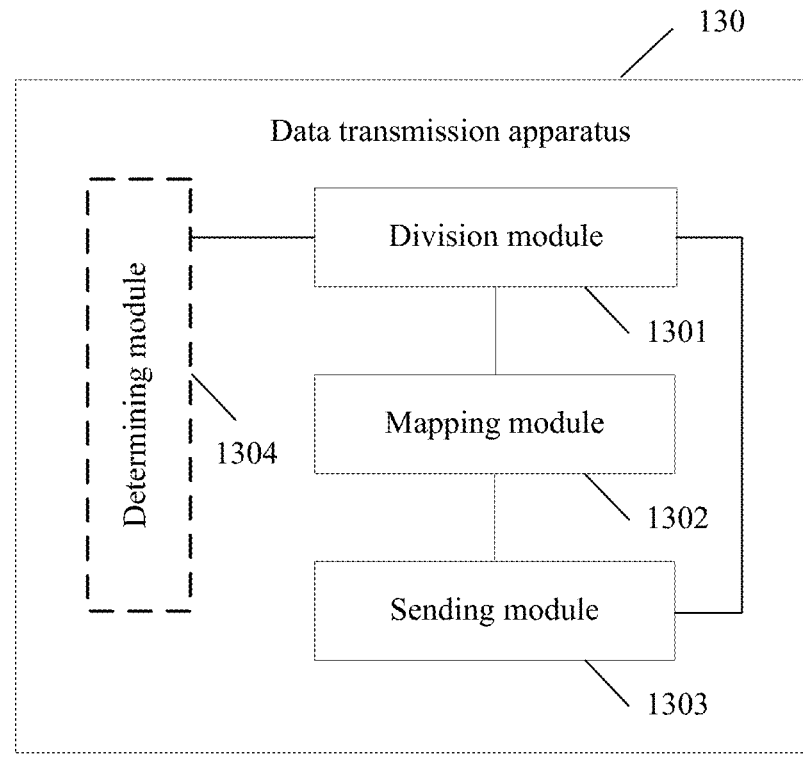
FIG. 13 is a schematic structural diagram of a data transmission apparatus according to an embodiment of the present disclosure.

When the function modules divided according to the functions are configured, FIG. 13 is a possible schematic structural diagram of a data transmission apparatus 130 according to an embodiment. The data transmission apparatus 130 may be the foregoing transmitting end. The data transmission apparatus 130 may include: a division module 1301, a mapping module 1302, and a sending module 1303. Optionally, the data transmission apparatus 130 may further include: a determining module 1304. A function of each of the function modules may be deduced from steps of each method embodiment provided above. Alternatively, for a function of each of the function modules, refer to the content provided in the SUMMARY part. Details are not described herein again.

When an integrated module is configured, the division module 1301, the mapping module 1302, and the determining module 1304 may be integrated into one processing module in the data transmission apparatus. In addition, the data transmission apparatus may further include: a receiving module and a storage module. The sending module 1303 and the receiving module may be integrated into one communication module in the data transmission apparatus.

Figure 14:
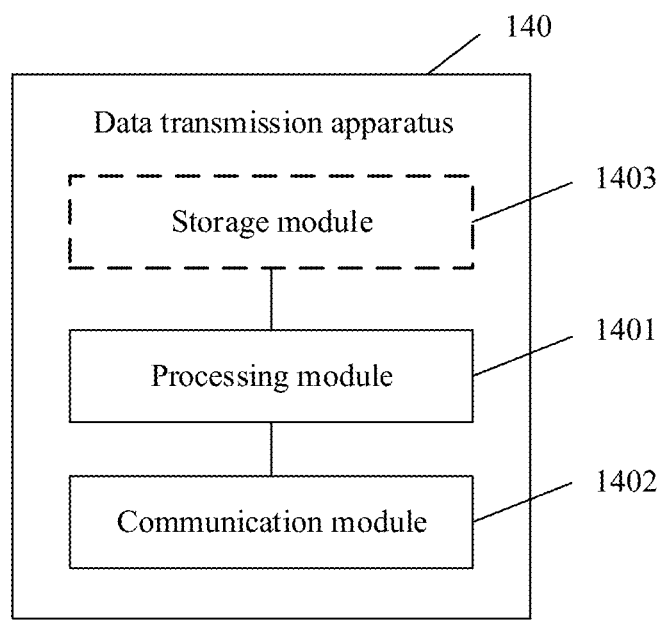
FIG. 14 is a schematic structural diagram of another data transmission apparatus according to an embodiment of the present disclosure.

FIG. 14 is a schematic structural diagram of a data transmission apparatus 140 according to an embodiment of the present disclosure. The data transmission apparatus 140 may be the foregoing transmitting end. The data transmission apparatus 140 may include: a processing module 1401 and a communication module 1402. The processing module 1401 is configured to control and manage actions of the data transmission apparatus 140. For example, the processing module 1401 is configured to support the data transmission apparatus 140 in performing S101 and S102 that are in FIG. 7, FIG. 8, FIG. 8a, and FIGS. 9, S100 and S100a that are in FIGS. 9, S301 and S302 that are in FIG. 12a, and the like, and/or is configured to support another process of the technology described in this specification. The communication module 1402 is configured to support the data transmission apparatus 140 in communication with another network entity, for example, communication with a receiving end. For example, the communication module 1402 is configured to support the data transmission apparatus 140 in performing S103 in FIG. 7, FIG. 8, FIG. 8a, and FIG. 9, S303 in FIG. 12a, and the like, and/or is configured to support another process of the technology described in this specification. Optionally, the data transmission apparatus 140 may further include: a storage module 1403, configured to store corresponding program code and corresponding data that are used by the data transmission apparatus 140 to perform any data transmission method provided above.

The processing module 1401 may be a processor or a controller. The communication module 1402 may be a transceiver, a transceiver circuit, a communication interface, or the like. The storage module 1403 may be a memory.

Figure 15:
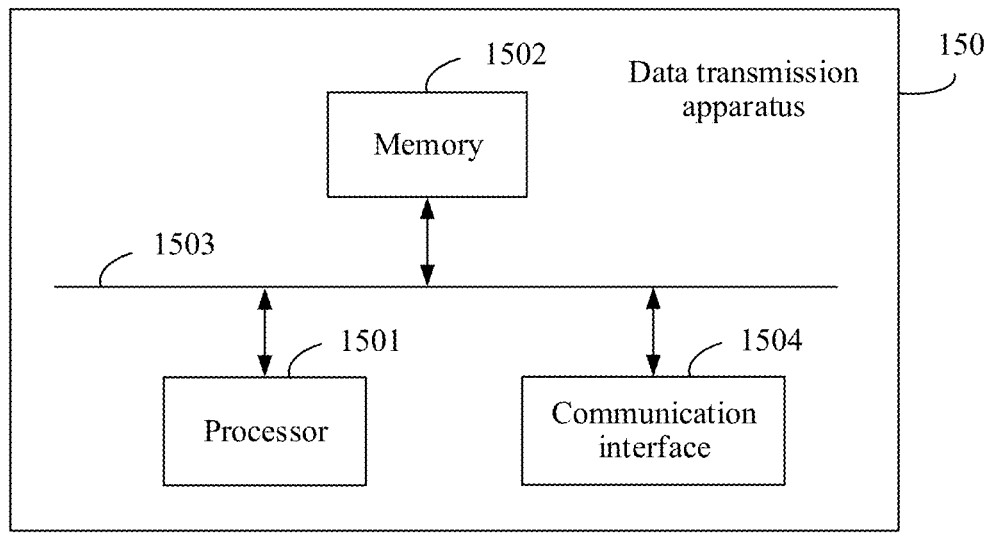
FIG. 15 is a schematic structural diagram of another data transmission apparatus according to an embodiment of the present disclosure.

When the processing module 1401 is a processor, the communication module 1402 is a transceiver, and the storage module 1403 is a memory, the data transmission apparatus 140 in this embodiment of the present disclosure may be shown in FIG. 15.

FIG. 15 is a schematic structural diagram of a data transmission apparatus 150 according to an embodiment of the present disclosure. The data transmission apparatus 150 includes: a processor 1501, a memory 1502, a system bus 1503, and a communication interface 1504. The processor 1501, the memory 1502, and the communication interface 1504 are connected by using the system bus 1503. The memory 1502 is configured to store a computer executable instruction. When the data transmission apparatus 150 runs, the processor 1501 executes the computer executable instruction stored in the memory 1502, so that the data transmission apparatus 150 performs any data transmission method provided in the embodiments of the present disclosure. For a specific data transmission method, refer to the foregoing descriptions and related descriptions in the accompanying drawings. Details are not described herein again.

This embodiment of the present disclosure further provides a storage medium. The storage medium may include the memory 1502.

The processor 1501 may be one processor, or may be a general term for a plurality of processing elements. For example, the processor 1501 may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor 1501 may implement or execute various examples of logical blocks, modules, and circuits that are described with reference to content disclosed in the present disclosure. The general purpose processor may be a microprocessor. Alternatively, the processor may be any conventional processor or the like. Alternatively, the processor 1501 may be a dedicated processor. The dedicated processor may include at least one of a baseband processing chip, a radio-frequency processing chip, and the like. The dedicated processor may further include a chip having another dedicated processing function of the data transmission apparatus 150.

The memory 1502 may include a transitory memory, for example, a random access memory (RAM). Alternatively, the memory 1502 may include a non-transitory memory, for example, a read-only memory (ROM), a flash memory, a hard disk drive (HDD), or a solid-state drive (SSD). Alternatively, the memory 1502 may include a combination of the foregoing types of memories.

The system bus 1503 may include a data bus, a power bus, a control bus, a signal status bus, and the like. For clear description, various buses are all marked as the system bus 1503 in FIG. 15 in this embodiment.

The communication interface 1504 may be specifically a transceiver on the data transmission apparatus 150. The transceiver may be a wireless transceiver. For example, the wireless transceiver may be an antenna of the data transmission apparatus 150. The processor 1501 receives data from or sends data to another device such as a base station through the communication interface 1504.

During specific implementation, steps in the procedure of any data transmission method provided above may be performed by the processor 1501, in a form of hardware, executing the computer executable instruction that is stored in the memory 1502 and that is in a form of software. To avoid repetition, details are not described herein again.

Figure 16:
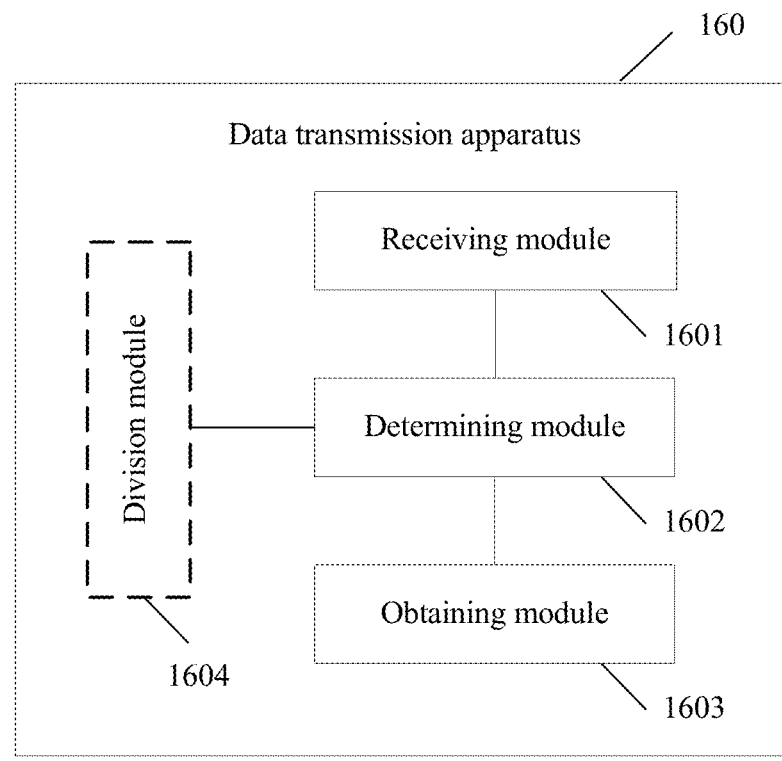
FIG. 16 is a schematic structural diagram of another data transmission apparatus according to an embodiment of the present disclosure.

When the function modules divided according to the functions are configured, FIG. 16 is a possible schematic structural diagram of a data transmission apparatus 160 according to an embodiment. The data transmission apparatus 160 may be the foregoing receiving end. The data transmission apparatus 160 may include: a receiving module 1601, a determining module 1602, and an obtaining module 1603. Optionally, the data transmission apparatus 160 may further include: a division module 1604. A function of each of the function modules may be deduced from steps of each method embodiment provided above. Alternatively, for a function of each of the function modules, refer to the content provided in the SUMMARY part. Details are not described herein again.

When an integrated module is configured, the determining module 1602, the obtaining module 1603, and the division module 1604 may be integrated into one processing module in the data transmission apparatus. In addition, the data transmission apparatus may further include: a sending module and a storage module. The receiving module 1601 and the sending module may be integrated into one communication module in the data transmission apparatus.

Figure 17:
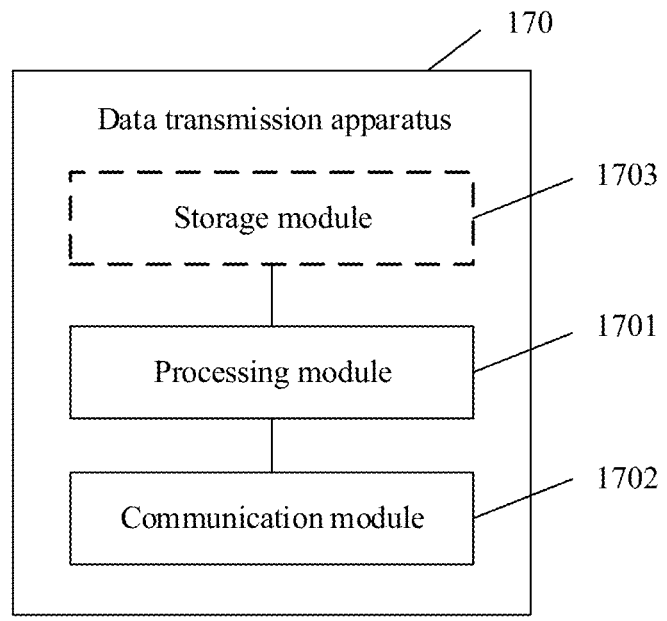
FIG. 17 is a schematic structural diagram of another data transmission apparatus according to an embodiment of the present disclosure.

FIG. 17 is a schematic structural diagram of a data transmission apparatus 170 according to an embodiment of the present disclosure. The data transmission apparatus 170 may include: a processing module 1701 and a communication module 1702. The processing module 1701 is configured to control and manage actions of the data transmission apparatus 170. For example, the processing module 1701 is configured to support the data transmission apparatus 170 in performing S203 and S204 that are in FIG. 10 and S305 in FIG. 12*a*, and/or is configured to support another process of the technology described in this specification. The communication module 1702 is configured to support the data transmission apparatus 170 in communication with another network entity, for example, communication with a transmitting end. For example, the communication module 1702 is configured to support the data transmission apparatus 170 in performing S304 in FIG. 12*a*, and/or is configured to support another process of the technology described in this specification. Optionally, the data transmission apparatus 170 may further include: a storage module 1703, configured to store corresponding program code and corresponding data that are used by the data transmission apparatus 170 to perform any data transmission method provided above.

The processing module 1701 may be a processor or a controller. The communication module 1702 may be a transceiver, a transceiver circuit, a communication interface, or the like. The storage module 1703 may be a memory.

Figure 18:
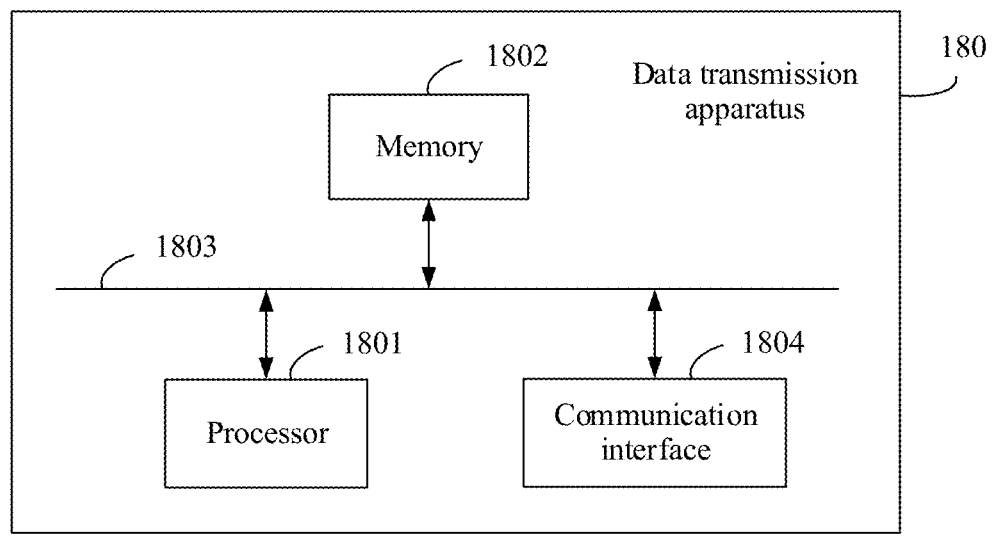
FIG. 18 is a schematic structural diagram of another data transmission apparatus according to an embodiment of the present disclosure.

When the processing module 1701 is a processor, the communication module 1702 is a transceiver, and the storage module 1703 is a memory, the data transmission apparatus 170 in this embodiment of the present disclosure may be shown in FIG. 18.

FIG. 18 is a schematic structural diagram of a data transmission apparatus 180 according to an embodiment of the present disclosure. The data transmission apparatus 180 may be the foregoing receiving end. The data transmission apparatus 180 may include: a processor 1801, a memory 1802, a system bus 1803, and a communication interface 1804. The processor 1801, the memory 1802, and the communication interface 1804 are connected by using the system bus 1803. The memory 1802 is configured to store a computer executable instruction. When the data transmission apparatus 180 runs, the processor 1801 executes the computer executable instruction stored in the memory 1802, so that the data transmission apparatus 180 performs any data transmission method provided in the embodiments of the present disclosure. For a specific data transmission method, refer to the foregoing descriptions and related descriptions in the accompanying drawings. Details are not described herein again.

This embodiment of the present disclosure further provides a storage medium. The storage medium may include the memory 1802. The processor 1801 may be one processor, or may be a general term for a plurality of processing elements. For example, the processor 1801 may be a CPU. Alternatively, the processor 1801 may be another general purpose processor, a DSP, an ASIC, an FPGA or another programmable logic device, a discrete gate or transistor logic device, a discrete hardware component, or the like. The general purpose processor may be a microprocessor. Alternatively, the processor may be any conventional processor or the like. Alternatively, the processor 1801 may be a dedicated processor. The dedicated processor may include at least one of a baseband processing chip, a radio-frequency processing chip, and the like. The dedicated processor may further include a chip having another dedicated processing function of the data transmission apparatus 180.

The memory 1802 may include a transitory memory, for example, a RAM.

Alternatively, the memory 1802 may include a non-transitory memory, for example, a ROM, a flash memory, an HDD, or an SSD. Alternatively, the memory 1802 may include a combination of the foregoing types of memories.

The system bus 1803 may include a data bus, a power bus, a control bus, a signal status bus, and the like. For clear description, various buses are all marked as the system bus 1803 in FIG. 18 in this embodiment.

The communication interface 1804 may be specifically a transceiver on the data transmission apparatus 180. The transceiver may be a wireless transceiver. For example, the wireless transceiver may be an antenna of the data transmission apparatus 180. The processor 1801 receives data from or sends data to another device such as a transmitting end through the communication interface 1804.

During specific implementation, steps in the procedure of any data transmission method provided above may be performed by the processor 1801, in a form of hardware, executing the computer executable instruction that is stored in the memory 1802 and that is in a form of software. To avoid repetition, details are not described herein again.

Persons skilled in the art should be aware that in one or more of the foregoing examples, the functions described in the present disclosure may be implemented by using hardware, software, firmware, or any combination thereof. When the functions are implemented by software, these functions may be stored in a computer readable medium or transmitted as one or more instructions or code in the computer readable medium. The computer readable medium includes a computer storage medium and a communication medium, where the communication medium includes any medium that enables a computer program to be transmitted from one place to another. The storage medium may be any available medium accessible to a general or dedicated computer.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
receiving, by a terminal device, control information;
receiving, by the terminal device based on the control information, data of a transport block (TB); and
obtaining, by the terminal device based on the control information, m code block (CB) groups in the TB, wherein m is a positive integer, $m=\min(N_{CB\_re}, N_{Group\_max})$, $N_{CB\_re}$ is a quantity of CBs in the TB, $N_{Group\_max}$ is a maximum quantity of CB groups for the TB, each of the m CB groups comprises at least one CB, and $N_{CB\_re}$ is determined based on a TB size (TBS) and a maximum size of a CB.

2. The method according to claim 1, wherein a quantity of CBs in each of the m CB groups is $C_+$ or $C_-$, wherein $$C_+ = \left\lceil \frac{N_{CB\_re}}{m} \right\rceil \text{ and } C_- = \left\lfloor \frac{N_{CB\_re}}{m} \right\rfloor.$$

3. The method according to claim 2, wherein in the m CB groups, each CB group of the first $N_+$ CB groups comprises $C_+$ CBs, each CB group of the last $N_-$ CB groups comprises $C_-$ CBs, wherein $N_+ = N_{CB\_re} - mC_-$ and $N_- = m - N_+$.

4. The method claim 1, wherein the control information comprises one redundancy version (RV) for the TB.

5. The method according to claim 1, wherein
the control information comprises $N_{Group\_max}$-bit information, and the $N_{Group\_max}$-bit information indicates whether data of each of the m CB groups is retransmitted.

6. The method according to claim 5, wherein the method further comprises:
sending an acknowledgement/negative acknowledgement (ACK/NACK) comprising $N_{Group\_max}$ bits.

7. The method according to claim 6, wherein each bit of the $N_{Group\_max}$ bits indicates whether data of a corresponding CB group is correctly checked or not.

8. A communication apparatus, comprising:
a transceiver;
at least one processor; and
a non-transitory computer-readable storage medium coupled to the at least one processor and storing programming instructions for execution by the at least one processor, wherein the programming instructions instruct the at least one processor to:
cause the transceiver to receive control information, and receive data of a transport block (TB); and
obtain, based on the control information, m code block (CB) groups in the TB, wherein m is a positive integer, $m=\min(N_{CB\_re}, N_{Group\_max})$, $N_{CB\_re}$ is a quantity of CBs in the TB, $N_{Group\_max}$ is a maximum quantity of CB groups, each of the m CB groups comprises at least one CB, and $N_{CB\_re}$ is determined based on a TB size (TBS) and a maximum size of a CB.

9. The apparatus according to claim 8, wherein a quantity of CBs in each of the
m CB groups is $C_+$ or $C_-$, wherein $$C_+ = \left\lceil \frac{N_{CB\_re}}{m} \right\rceil \text{ and } C_- = \left\lfloor \frac{N_{CB\_re}}{m} \right\rfloor.$$

10. The apparatus according to claim 9, wherein in the m CB groups, each CB group of the first $N_+$ CB groups comprises $C_+$ CBs, each CB group of the last $N_-$ CB groups comprises $C_-$ CBs, wherein $N_+ = N_{cB\_re} - mC_-$ and $N_- = m - N_+$.

11. The apparatus according to claim 8, wherein the control information comprises one redundancy version (RV) for the TB.

12. The apparatus according to claim 8, wherein the control information comprises $N_{Group\_max}$-bit information, and the $N_{Group\_max}$-bit information indicates whether data of each of the m CB groups is retransmitted.

13. The apparatus according to claim 12, wherein
the transceiver is further configured to send an acknowledgement/negative acknowledgement (ACK/NACK) comprising $N_{Group\_max}$ bits.

14. The apparatus according to claim 13, wherein each bit of the $N_{Group\_max}$ bits indicates whether data of a corresponding CB group is correctly checked or not.

15. A processing apparatus, comprising:
at least one processor; and
a non-transitory computer-readable storage medium coupled to the at least one processor and storing programming instructions for execution by the at least one processor, wherein the programming instructions instruct the at least one processor to
decode control information;
decode, based on the control information, data of a transport block (TB); and
obtain, based on the control information, m code block (CB) groups in the TB, wherein m is a positive integer, $m=\min(N_{CB\_re}, N_{Group\_max})$, $N_{CB\_re}$ is a quantity of CBs in the TB, $N_{Group\_max}$ is a maximum quantity of CB groups for the TB, each of the m CB groups comprises at least one CB, and $N_{CB\_re}$ is determined based on a TB size (TBS) and a maximum size of a CB.

16. The processing apparatus according to claim 15, wherein a quantity of CBs in each of the m CB groups is $C_+$ or $C_-$, wherein $$C_+ = \left\lceil \frac{N_{CB\_re}}{m} \right\rceil \text{ and } C_- = \left\lfloor \frac{N_{CB\_re}}{m} \right\rfloor.$$

17. The processing apparatus according to claim 16, wherein in the m CB groups, each CB group of the first $N_+$ CB groups comprises $C_+$ CBs, each CB group of the last $N_-$ CB groups comprises $C_-$ CBs, wherein $N_+=N_{CB\_re}-mC_-$ and $N_-=m-N_+$.

18. The processing apparatus claim 15, wherein the control information comprises one redundancy version (RV) for the TB.

19. The processing apparatus according to claim 15, wherein
the control information comprises $N_{Group\_max}$-bit information, and the $N_{Group\_max}$-bit information indicates whether data of each of the m CB groups is retransmitted.

20. The processing apparatus according to claim 15, wherein the programming instructions instruct the at least one processor to:
send an acknowledgement/negative acknowledgement (ACK/NACK) comprising $N_{Group\_max}$ bits.

21. The processing apparatus according to claim 20, wherein each bit of the $N_{Group\_max}$ bits indicates whether data of a corresponding CB group is correctly checked or not.

22. A non-transitory computer-readable storage medium comprising instructions which, when executed by a terminal device, cause the terminal device to perform operations comprising:
receiving control information;
receiving, based on the control information, data of a transport block (TB); and
obtaining, based on the control information, m code block (CB) groups in the TB, wherein m is a positive integer, $m=\min(N_{CB\_re}, N_{Group\_max})$, $N_{CB\_re}$ is a quantity of CBs in the TB, $N_{Group\_max}$ is a maximum quantity of CB groups for the TB, each of the m CB groups comprises at least one CB, and $N_{CB\_re}$ is determined based on a TB size (TBS) and a maximum size of a CB.

23. The non-transitory computer-readable storage medium according to claim 22, wherein a quantity of CBs in each of the m CB groups is $C_+$ or $C_-$, wherein $$C_+ = \left\lceil \frac{N_{CB\_re}}{m} \right\rceil \text{ and } C_- = \left\lfloor \frac{N_{CB\_re}}{m} \right\rfloor.$$

24. The non-transitory computer-readable storage medium according to claim 23, wherein in the m CB groups, each CB group of the first $N_+$ CB groups comprises $C_+$ CBs, each CB group of the last $N_-$ CB groups comprises $C_-$ CBs, wherein $N_+=N_{CB\_re}-mC_-$ and $N_-=m-N_+$.

* * * * *

UNITED STATES PATENT AND TRADEMARK OFFICE
CERTIFICATE OF CORRECTION

Page 1 of 1

PATENT NO. : 10,856,286 B2
APPLICATION NO. : 16/402818
DATED : December 1, 2020
INVENTOR(S) : Jinlin Peng et al.

It is certified that error appears in the above-identified patent and that said Letters Patent is hereby corrected as shown below:

In the Claims

In Column 43, Line 57, in Claim 4, after "method" insert -- according to --.

In Column 44, Line 34, in Claim 10, delete "$N_+=N_{cB\_re} - mC\_$" and insert -- $N_+ = N_{CB\_re} - mC\_$ --, therefor.

In Column 45, Line 14, in Claim 18, delete "apparatus" and insert -- apparatus according to --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*